(12) United States Patent
Yamagishi et al.

(10) Patent No.: US 7,492,877 B2
(45) Date of Patent: Feb. 17, 2009

(54) SYSTEM AND METHOD FOR REMOTE CONTROL

(75) Inventors: Toshihiro Yamagishi, Yokohama (JP); Hirofumi Yamashita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 939 days.

(21) Appl. No.: 10/846,625

(22) Filed: May 17, 2004

(65) Prior Publication Data
US 2005/0123109 A1    Jun. 9, 2005

(30) Foreign Application Priority Data
Dec. 8, 2003    (JP) .............................. 2003-409370

(51) Int. Cl.
H04M 3/42    (2006.01)
(52) U.S. Cl. ................... 379/102.01; 709/208
(58) Field of Classification Search ......... 709/220–224, 709/208; 379/102.01–102.04; 370/392
See application file for complete search history.

(56) References Cited

U.S. PATENT DOCUMENTS

| | | | | |
|---|---|---|---|---|
| 4,625,080 A * | 11/1986 | Scott | ...................... | 379/102.03 |
| 6,049,879 A * | 4/2000 | Davis et al. | .................. | 713/300 |
| 6,272,136 B1 * | 8/2001 | Lin et al. | ..................... | 370/392 |
| 6,788,693 B1 * | 9/2004 | Christie et al. | ............... | 370/401 |
| 6,920,506 B2 * | 7/2005 | Barnard et al. | .............. | 709/223 |
| 7,246,248 B2 * | 7/2007 | Hirezaki et al. | ............. | 713/310 |
| 2002/0073183 A1 * | 6/2002 | Yoon et al. | ................... | 709/222 |
| 2002/0097851 A1 * | 7/2002 | Daum et al. | ........... | 379/102.03 |
| 2004/0052347 A1 * | 3/2004 | Kimura et al. | ......... | 379/102.01 |
| 2004/0243684 A1 * | 12/2004 | Ha et al. | ..................... | 709/208 |
| 2005/0073522 A1 * | 4/2005 | Aholainen et al. | .......... | 345/440 |

FOREIGN PATENT DOCUMENTS

| | | |
|---|---|---|
| JP | 10-191466 | 7/1998 |
| JP | 2002-218566 | 8/2002 |

* cited by examiner

*Primary Examiner*—Curtis Kuntz
*Assistant Examiner*—Maria El-Zoobi
(74) *Attorney, Agent, or Firm*—Antonelli, Terry, Stout & Kraus, LLP.

(57) ABSTRACT

In this invention, an apparatus of which the power supply is in the off state is remotely controlled through a communications network. Each of one or a plurality of controlled apparatus has a ROM for holding the MAC address of the controlled apparatus, and a network control IC that reads out the MAC address from the ROM and transmits it through a LAN to a control apparatus. The control apparatus receives the one or plurality of MAC addresses from the one or plurality of controlled apparatus through the LAN, stores the received one or plurality of MAC addresses in a cache memory and controls the one or plurality of controlled apparatus by using the one or plurality of MAC addresses stored in the cache memory.

19 Claims, 26 Drawing Sheets

CONTENTS TABLE STORED IN CONTROLLED APPARATUS 71-n

| CONTENTS NAME (TITLE) | ATTRIBUTES (FILE TYPES) | PLAYING TIME LENGTH | ... | STORAGE LOCATION DIRECTORY |
|---|---|---|---|---|
| CONTENT 10001 | MPEG | 100 MINUTES | ... | \X:\yyy\ zzzz\ Dc\ CONTENT 1 |
| CONTENT 10002 | JPEG | 0 MINUTE | ... | \X:\yyy\ zzzz\ Dc\ CONTENT 2 |
| --- | --- | --- | --- | --- |
| CONTENT 1m | MP3 | 5 MINUTES | ... | \X:\yyy\ zzzz\ Dc\ CONTENT m |

CONTROLLED APPARATUS

FIG. 12

CONTROL APPARATUS 25

CONTENTS TABLE OF EACH CONTROLLED APPARATUS STORED IN CONTROL APPARATUS (TABLE FOR EACH CONTROLLED APPARATUS) 71-1

| CONTENTS NAME (TITLE) | ATTRIBUTES (FILE TYPES) | PLAYING TIME LENGTH | ......... |
|---|---|---|---|
| CONTENT n0001 | MPEG | 100 MINUTES | --- |
| CONTENT n0002 | JPEG | 0 MINUTE | --- |
| --- | --- | --- | --- |
| CONTENT nm | MP3 | 5 MINUTES | --- |

CONTROL APPARATUS 25

INDEX TABLE FOR SEARCHING FOR CONTENTS 75

| CONTENTS NAME (TITLE) | MACHINE NAME AT STORAGE LOCATION | CONTENTS TABLE NAME (OR PATH NAME) AT STORAGE LOCATION |
|---|---|---|
| CONTENT 10001 | Server-1 | ContentsTable_Server-1(\ X:\yyyy\ zzzz\ ▯c\ ConTbl_Srv-1) |
| CONTENT 30002 | Server-3 | ContentsTable_Server-3(\ X:\yyyy\ zzzz\ ▯c\ ConTbl_Srv-3) |
| --- | --- | --- |
| CONTENT nm | Server-n | ContentsTable_Server-n(\ X:\yyyy\ zzzz\ ▯c\ ConTbl_Srv-n) |

FIG. 18

INITIAL PICTURE

DISPLAYED PICTURE OF CONTENTS LIST — 101

| CONTENTS NAME | OTHER META INFORMATION (IF NECESSARY) |
|---|---|
| CONTENT 10001 | ------ |
| CONTENT 10002 | ------ |
| -- | -- |
| CONTENT nm | ------ |

DISPLAYED PICTURE OF CONTENTS LIST — 103

| CONTENTS NAME | OTHER META INFORMATION (IF NECESSARY) |
|---|---|
| CONTENT 10001 | ------ |
| CONTENT 10002 | ------ |
| -- | -- |
| CONTENT nmf | ------ |

DISPLAYED PICTURE OF CONTROLLED APPARATUS LIST — 105

| MACHINE NAME OF USABLE APPARATUS | OTHER META INFORMTION (IF NECESSARY) |
|---|---|
| Server-n | CONTENTS STORAGE APPARATUS |
| Display-m | PICTURE OUTPUT UNIT |
| -- | -- |
| Camera-p | DATA INPUT UNIT |

PICTURE OF POWER-ON STATUS WAITING MODE — 107

POWER STATUS MANAGEMENT PICTURE

| MACHINE NAME OF USABLE APPARATUS | APPARATUS STATUS | POWER CONTROL |
|---|---|---|
| Server-n | POWERED OFF | UNDER POWER-ON PROCESS |
| Display-m | POWERED ON | STATUS KEPT |
| -- | -- | -- |
| Camera-p | POWERED OFF | UNDER POWER-ON PROCESS |

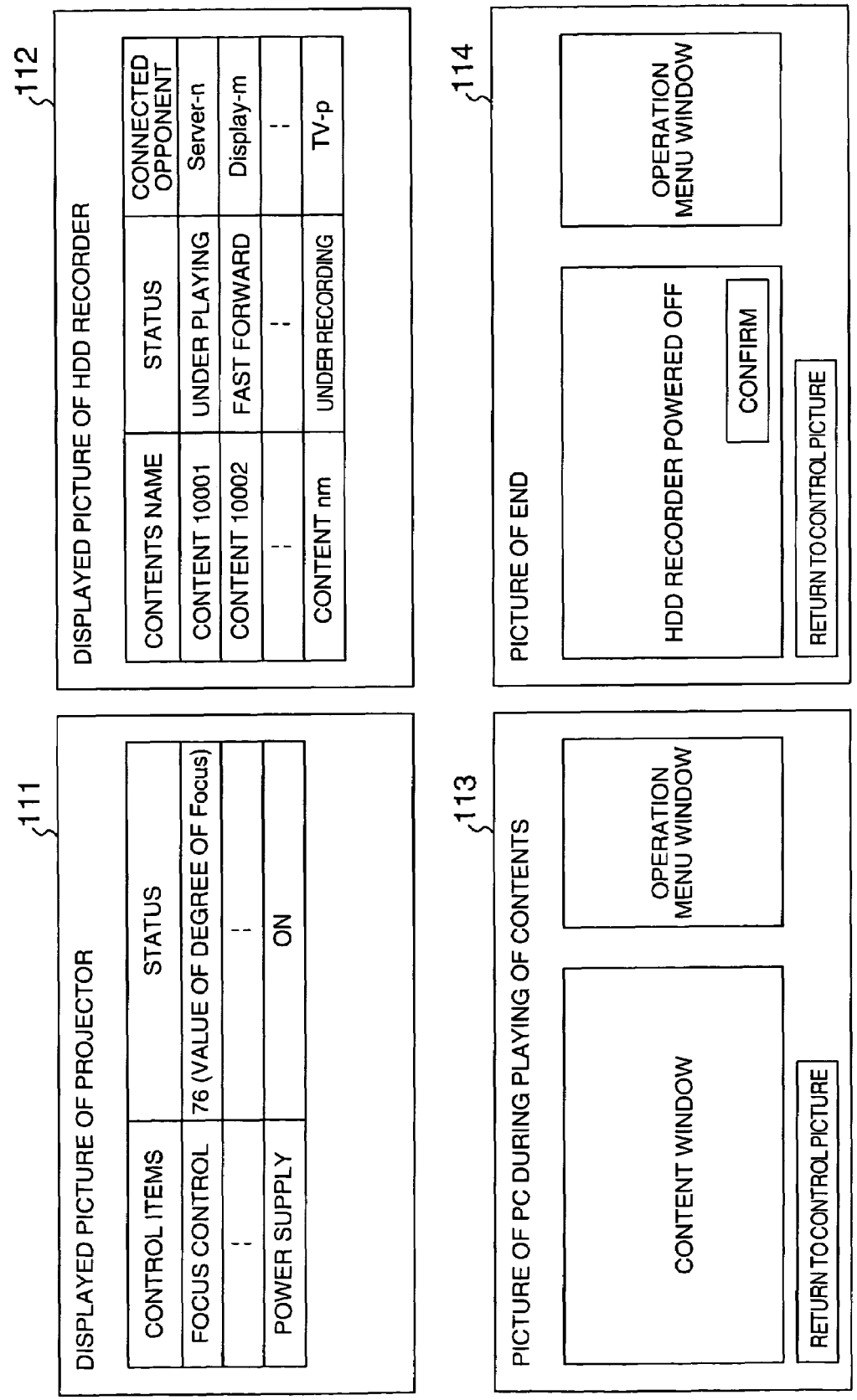

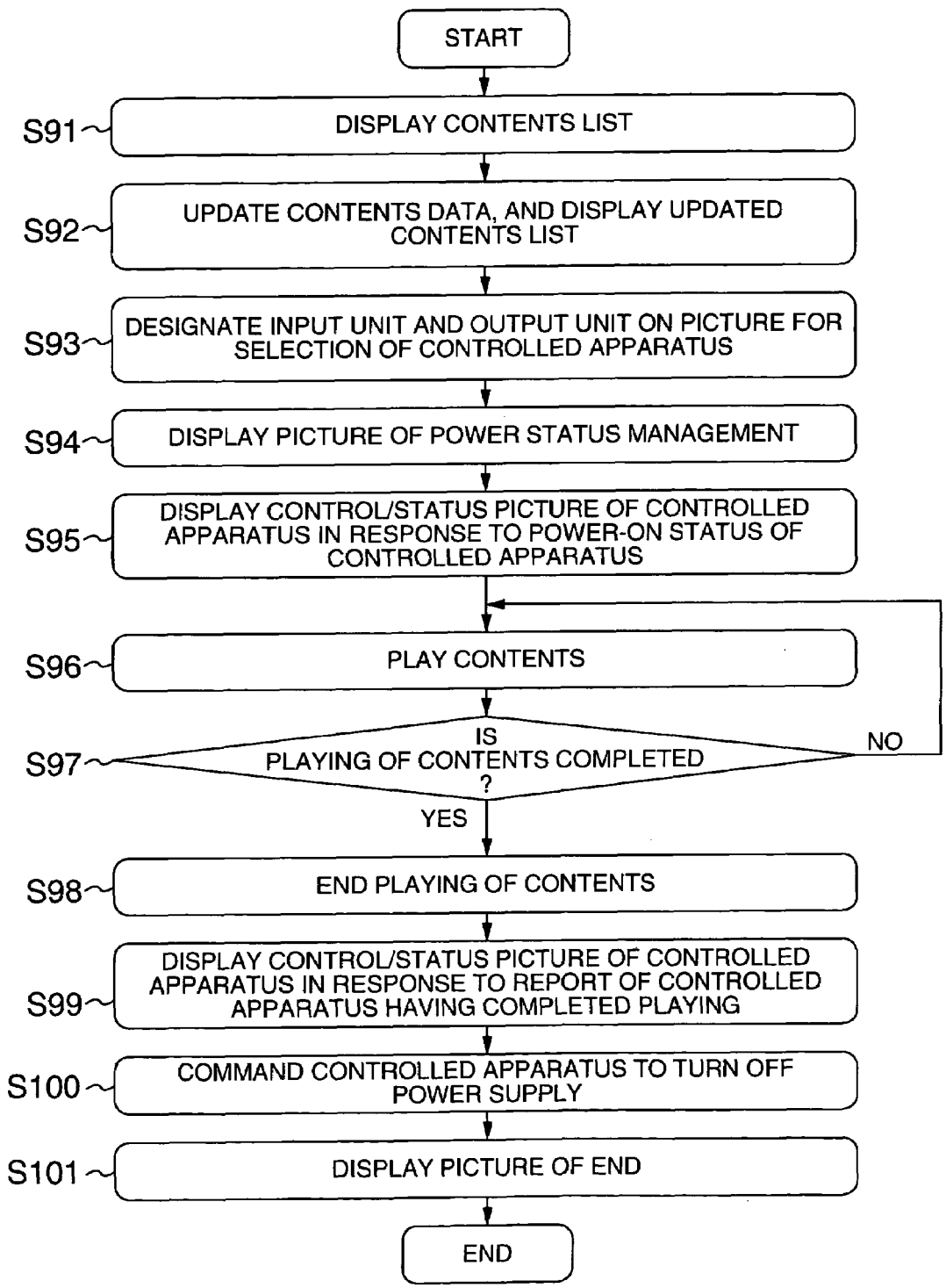

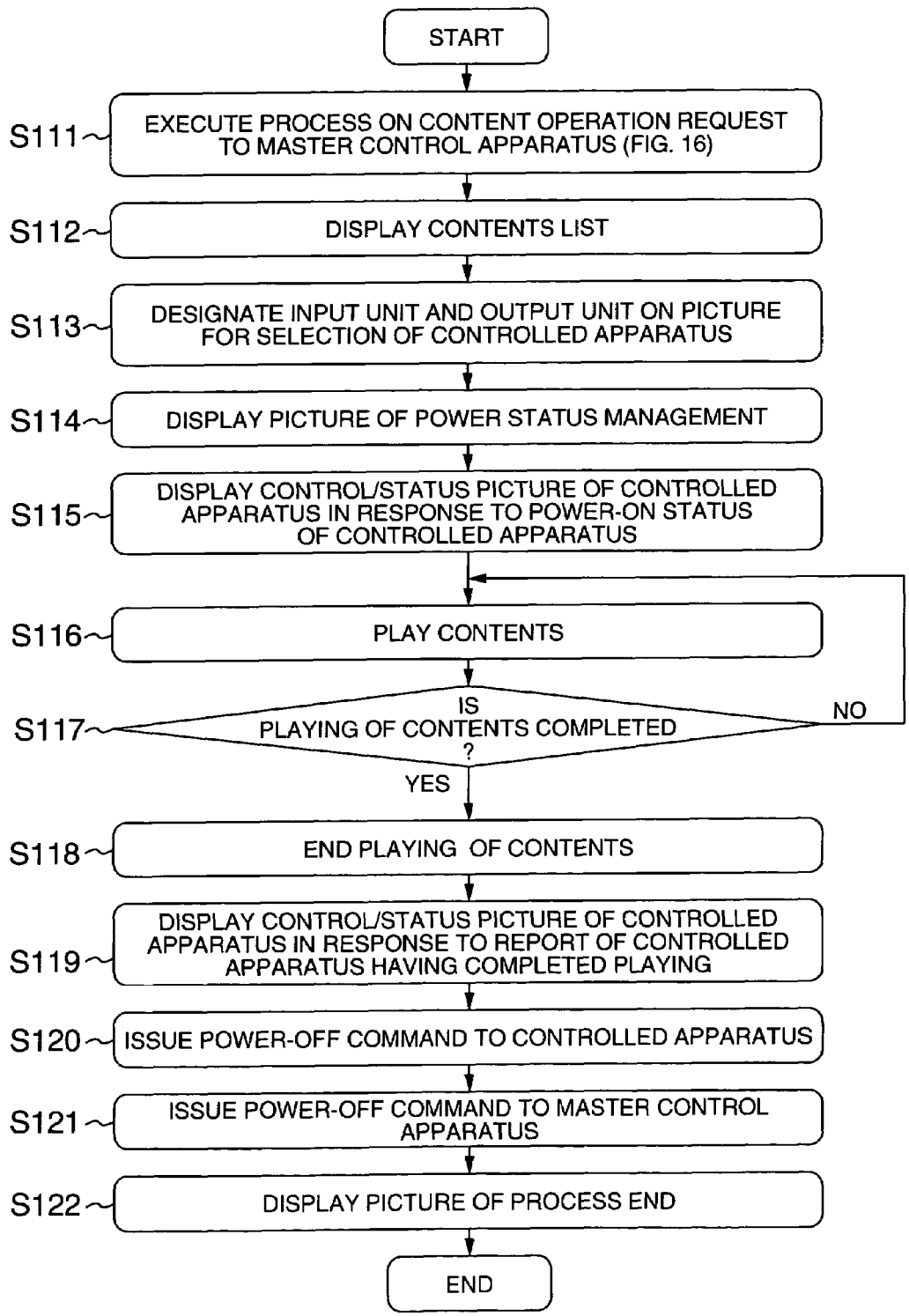

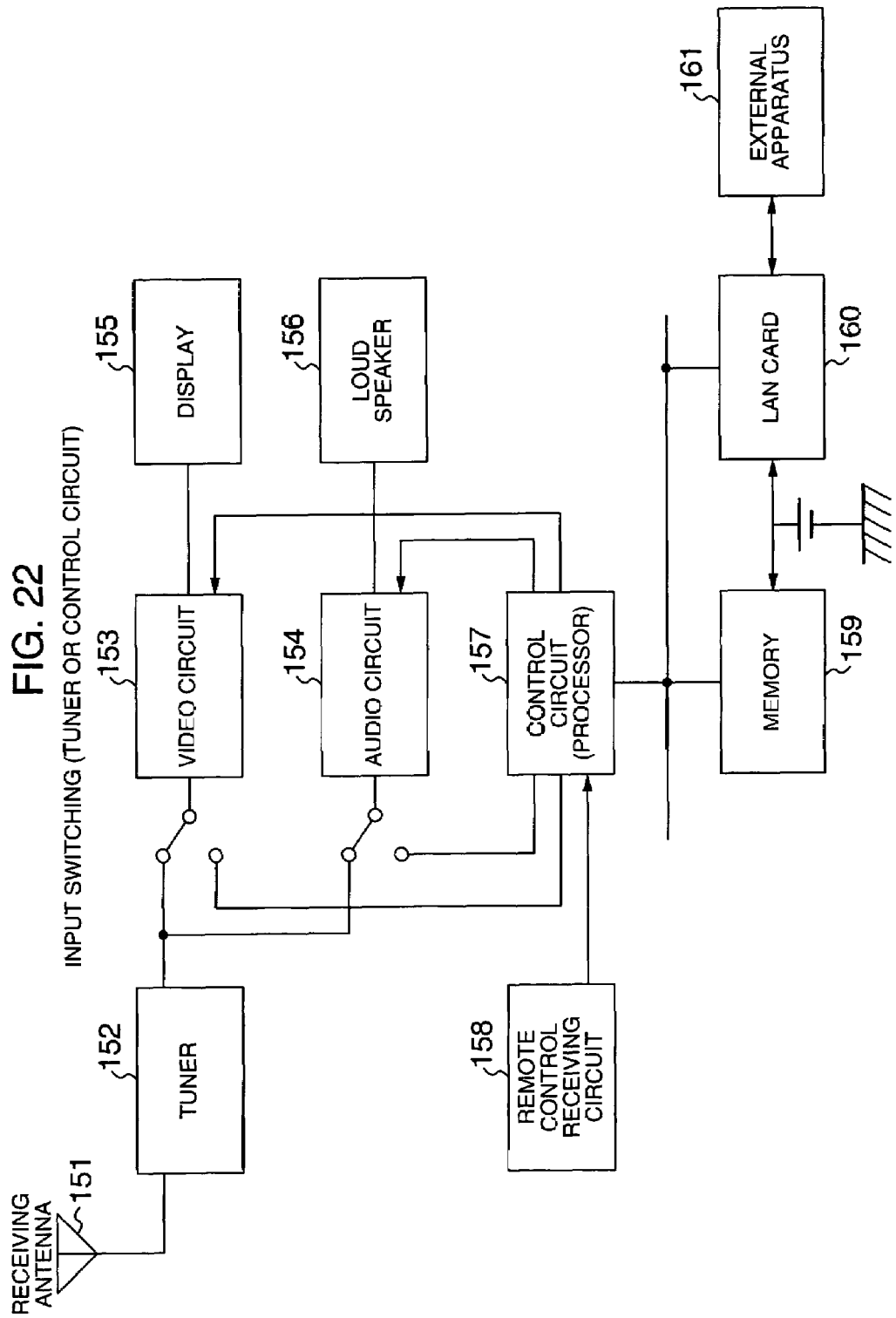

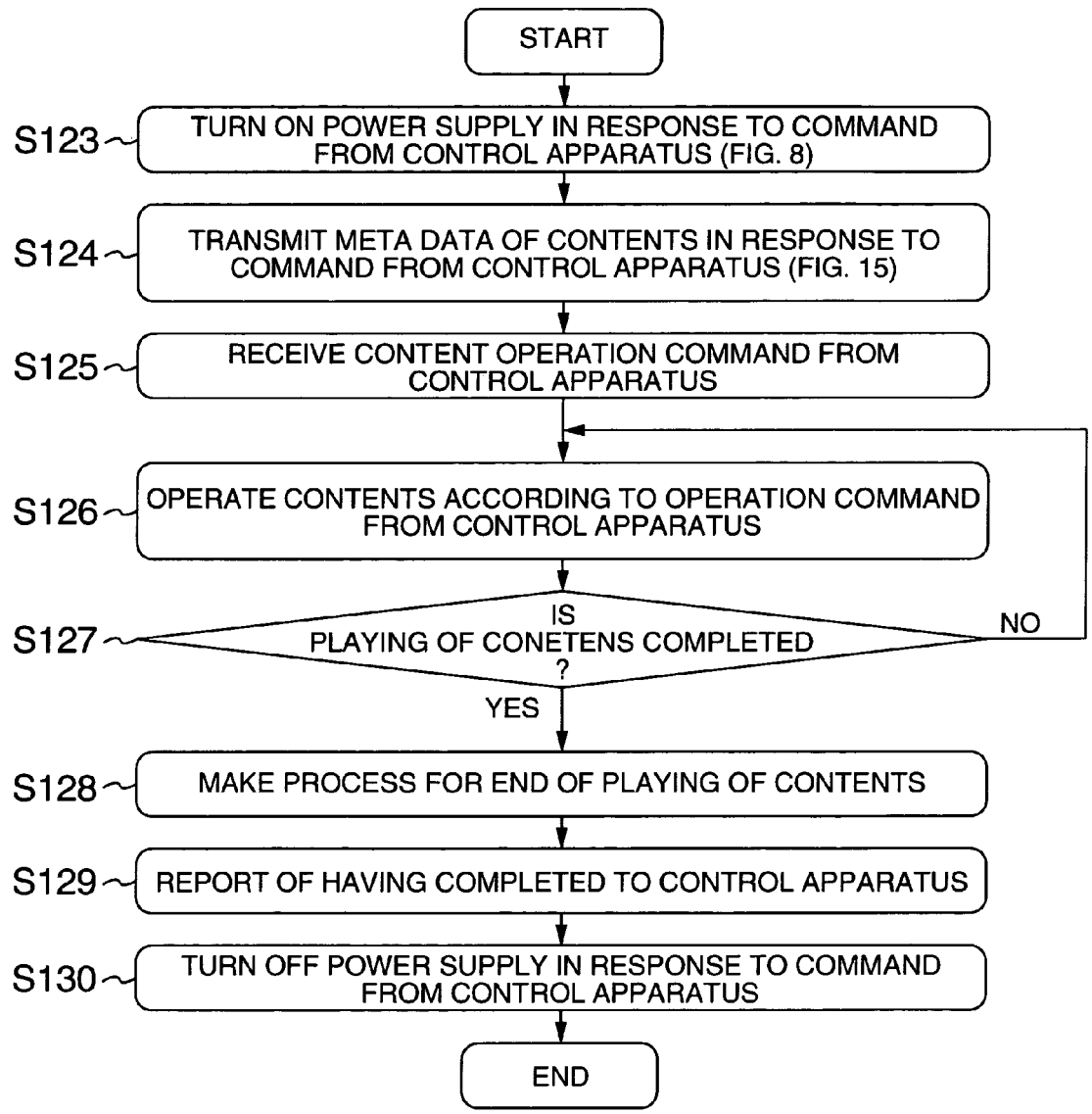

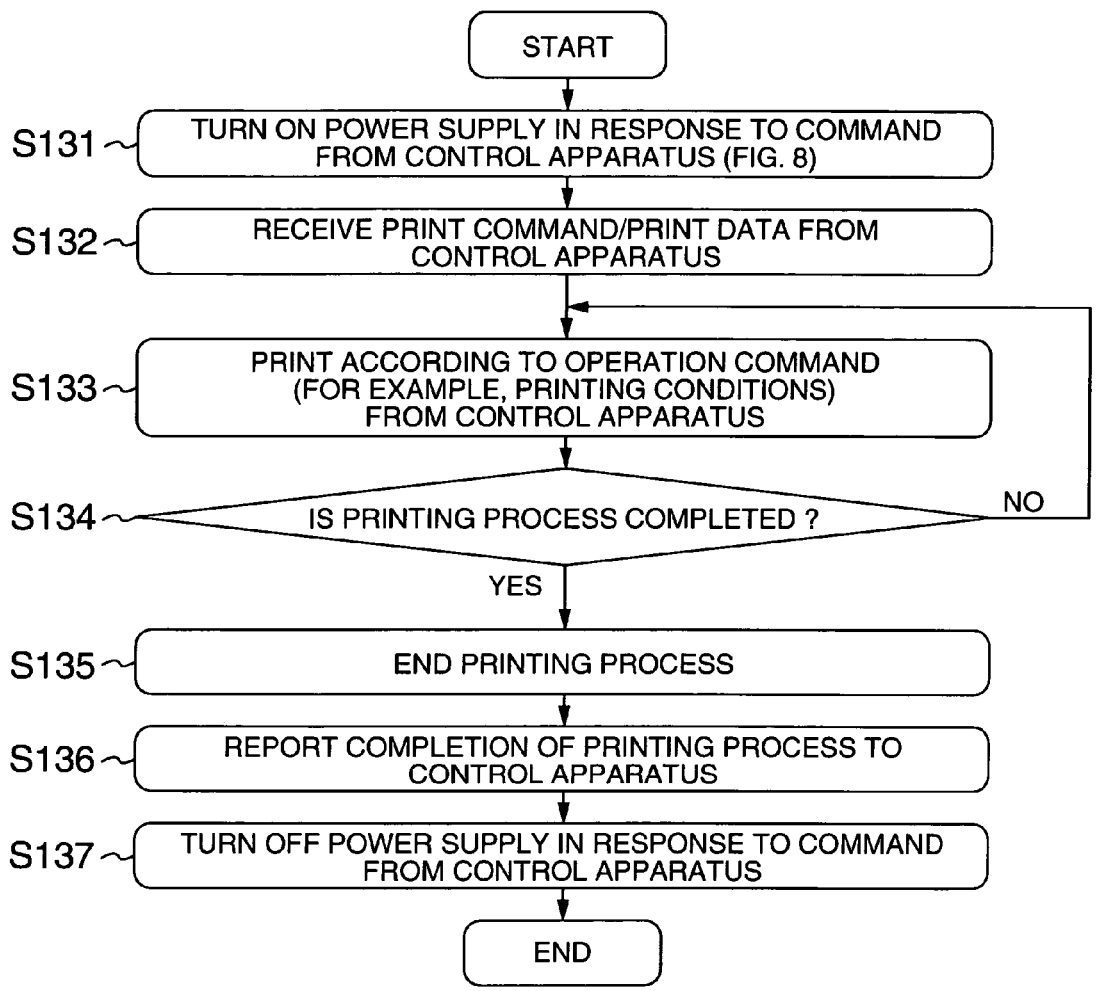

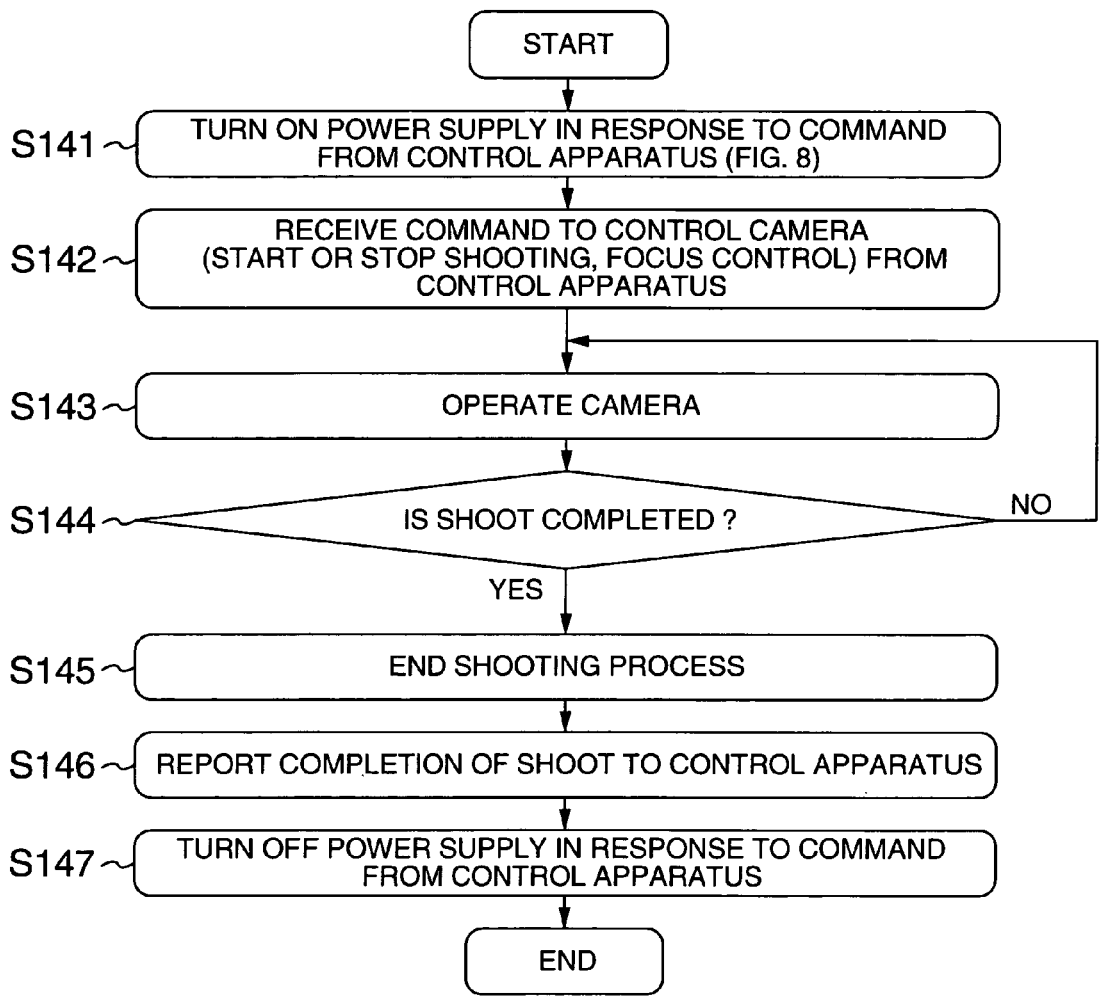

SYSTEM AND METHOD FOR REMOTE CONTROL

INCORPORATION BY REFERENCE

The present application claims priority from Japanese application JP2003-409370 filed on Dec. 8, 2003, the content of which is hereby incorporated by reference into this application.

BACKGROUND OF THE INVENTION

The present invention relates to techniques for controlling remote apparatus through communications networks such as LAN.

There is known a technique (for example, JP-A-2002-218566) in which IP addresses are assigned to household appliances, and the user calls the IP addresses of the household appliances through a communications network and remotely controls the household appliances.

SUMMARY OF THE INVENTION

Each time appliances are respectively connected to a communications network, IP addresses are respectively allocated to the appliances by an automatic address generation/allocation function such as DHCP (Dynamic Host Configuration Protocol). Therefore, when an appliance is powered off but physically kept connected to the communications network, the IP address which had been available for that appliance might be assigned to another appliance connected afresh to the communications network. Thus, the user cannot call the powered-off appliance at all times under the technique disclosed in JP-A-2002-218566.

Accordingly, it is an object of the invention to remotely control the powered-off appliance through the communications network.

Other objects of the invention will be understood from the later description.

A remote control system according to the invention is a system for remotely controlling the apparatus connected to a communication network, and it has one or a plurality of controlled apparatus and control apparatus for controlling the controlled apparatus through the communications network. Each of the one or plurality of controlled apparatus has controlled storage means that has recorded therein invariable fixed identification information for uniquely identifying the controlled apparatus, and fixed identification information transmission means that reads out the fixed identification information from the controlled storage means and transmits the fixed identification information through the communications network to the control apparatus. The control apparatus has fixed identification information receiving means that receives the one or plurality of pieces of fixed identification information from the one or plurality of controlled apparatus through the communications network, control storage means for storing the received one or plurality of pieces of fixed identification information, and control means that controls the one or plurality of controlled apparatus through the communications network by using the one or plurality of pieces of fixed identification information stored in the control storage means.

The control apparatus according to the invention is the apparatus that remotely controls the one or plurality of controlled apparatus connected to the communications network. The control apparatus has fixed identification information receiving means that receives the one or plurality of pieces of fixed identification information for identifying the one or plurality of controlled apparatus from the one or plurality of controlled apparatus through the communications network, fixed identification information storage means for storing the received one or plurality of pieces of fixed identification information, and control means that controls the one or plurality of controlled apparatus through the communications network by using the one or plurality of pieces of fixed identification information stored in the fixed identification information storage means.

The controlled apparatus according to the invention is the apparatus that are controlled by the control apparatus through the communications network. The controlled apparatus has controlled storage means that stores invariable fixed identification information for uniquely identifying the controlled apparatus, fixed identification information transmission means that reads out the fixed identification information from the controlled storage means and transmits the fixed identification information through the communications network to the control apparatus, and controlled means that is controlled by the control apparatus that has received the fixed identification information.

According to the invention, the apparatus of which the power supply is in the off state can be remotely controlled through the communications network.

Other objects, features and advantages of the invention will become apparent from the following description of the embodiments of the invention taken in conjunction with the accompanying drawings.

BRIEF DESCRIPTION OF THE DRAWINGS

FIG. 11 shows the controlled apparatus 17 with contents table in the fourth embodiment of the invention.

FIG. 12 shows the control apparatus 25 with contents table in the fourth embodiment of the invention.

FIG. 13 shows the control apparatus 25 with index table for searching contents in the fourth embodiment of the invention.

FIG. 18 shows examples of various GUI pictures displayed on the display screen of PC 3 in the seventh embodiment of the invention.

FIG. 19 shows examples of another various GUI pictures displayed on the display screen of PC 3 in the seventh embodiment of the invention.

FIG. 20 is a flowchart of processes in which PC3 makes in the seventh embodiment of the invention.

FIG. 21 is a flowchart of processes in which PC 3 makes when operating as the slave control apparatus.

FIG. 22 is a block diagram of the hardware structure of TV set 5 in the eighth embodiment of the invention.

FIG. 24 is a flowchart of processes in which the HDD recorder 7 makes in the ninth embodiment of the invention.

FIG. 25 is a flowchart of processes in which the printer 13 makes in the tenth embodiment of the invention.

FIG. 26 is a flowchart of processes in which the video camera 11 makes in the eleventh embodiment of the invention.

DESCRIPTION OF THE EMBODIMENTS

Various embodiments of the invention will be described with reference to the accompanying drawings.

First Embodiment

Figure 1:
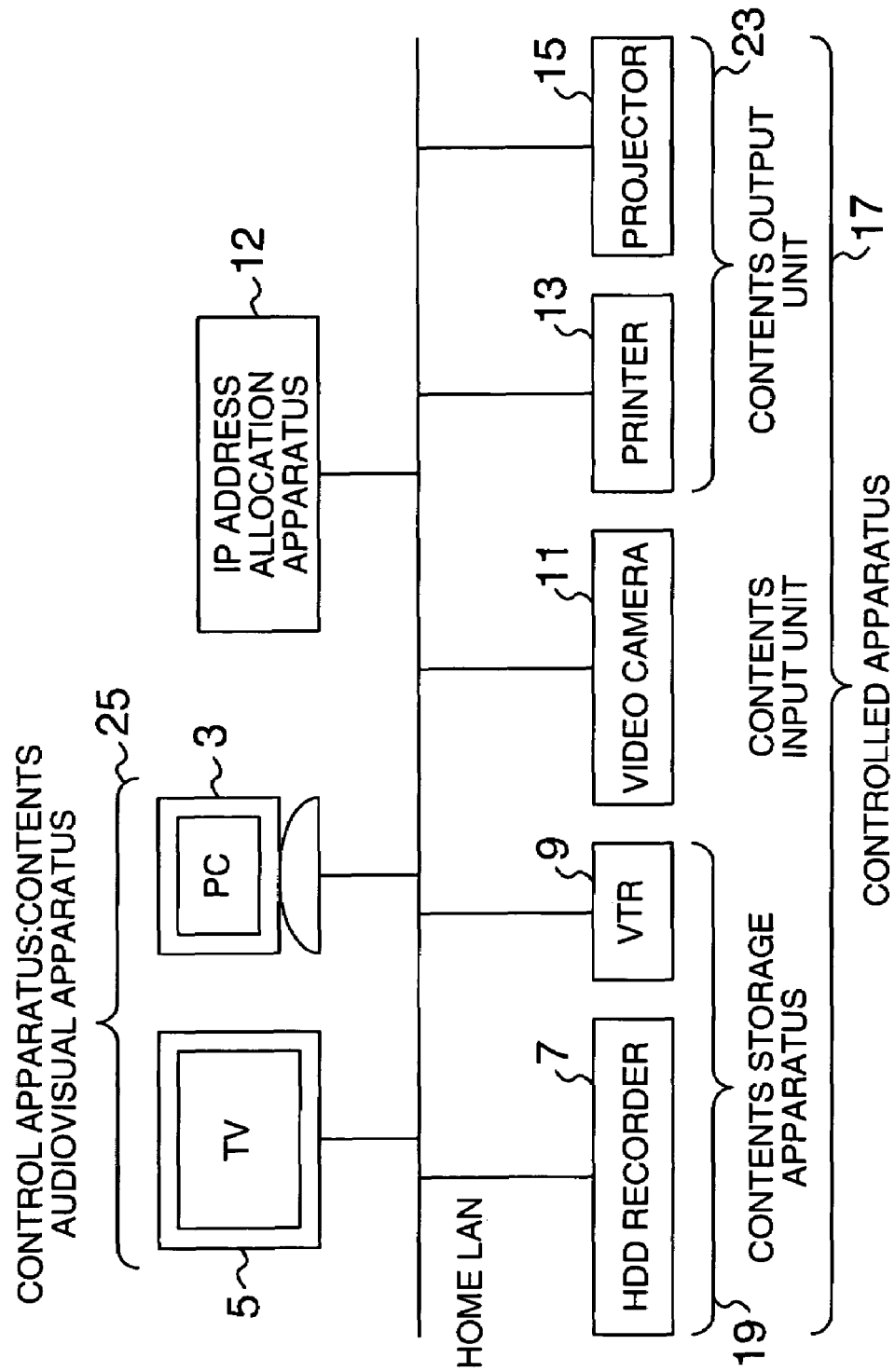
FIG. 1 is a block diagram of the whole arrangement of a system according to the first embodiment of the invention.

FIG. 1 shows the whole structure of the system according to the first embodiment of the invention.

A wireless or wired LAN (hereinafter, referred to as "home LAN") 1 is installed within a house or building such as a dwelling place. This home LAN (Local Area Network) 1 connects one or a plurality of control apparatus 25 for controlling prescribed apparatus connected to this home LAN 1, one or a plurality of controlled apparatus 17 to be controlled by the control apparatus 25, and an IP address allocation apparatus 12 (each of the control apparatus 25 and each of the controlled apparatus 17 are not necessarily always connected to home LAN 1, but may be connected to or disconnected from the home LAN 1 in response to the user's demand or automatically).

The control apparatus 25 may be various different apparatus. For example, the control apparatus 25 includes audiovisual apparatus that can display contents such as moving pictures on its display. The audiovisual apparatus has, for example, the display and a display control unit by which the display is controlled to indicate on its screen a GUI (Graphic User Interface) for issuing prescribed commands to the controlled apparatus 17. The audiovisual apparatus is, for example, TV set 5 or personal computer 3 (it is, of course, not limited to the above, but may be PDA (Personal Digital Assistants) or a cellular phone).

The controlled apparatus 17 receives a command (packet) from the control apparatus 25, and turns on or off its power supply in response to the command (packet). The controlled apparatus 17 may be various types of apparatus. For example, the controlled apparatus 17 includes a contents storage apparatus 19, a contents input unit 21, and a contents output unit 23. The contents storage apparatus 19 is the apparatus that receives contents (for example, moving pictures, still pictures, sound or text) from external apparatus (for example, control apparatus 25) and stores them in prescribed media (for example, hard disks, magnetic tape or DVD). For example, it includes a hard disk recorder (HDD recorder) 7 or video tape recorder (VTR) 9. The contents input unit 21 is the apparatus that enters contents such as still pictures or moving pictures into its inside and supplies them through the home LAN 1 to the control apparatus 25. It is, for example, a video camera 11. The contents output unit 23 is the apparatus that receives contents through the home LAN 1 from the control apparatus 25 and visually produces them. It is, for example, a projector 15 for projecting contents on a certain screen or a printer 13 for printing contents on predetermine paper.

The IP address allocation apparatus 12, under the technique of DHCP (Dynamic Host Configuration Protocol), responds to the inquiry from the control apparatus 25 and controlled apparatus 17 connected to the home LAN 1 to recognize the apparatus 25, 17 and supply IP addresses to the apparatus 25, 17.

In this system, for example, the user can operate the control apparatus 25 placed in his or her room to control the controlled apparatus 17 placed in another room (to turn on and off its power supply, as an example). This operation will be described in detail.

Figure 2:
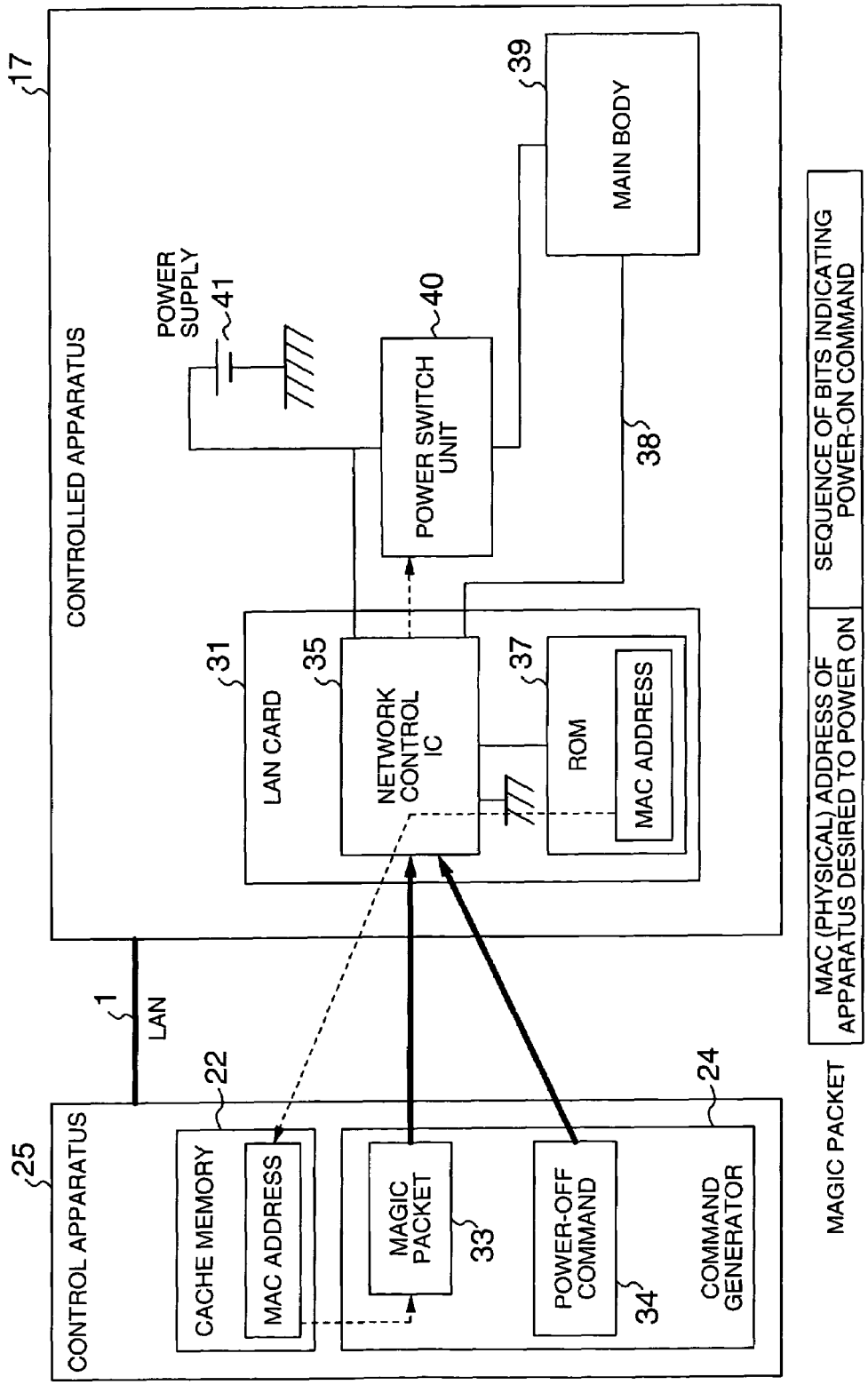
FIG. 2 is a block diagram of control apparatus 25 and controlled apparatus 17.

FIG. 2 shows the constructions of control apparatus 25 and controlled apparatus 17.

The control apparatus 25 and controlled apparatus 17 each have software, though not shown, according to the IP network technique (for example, UPnP (Universal Plug and Play) technique). The control apparatus 25 and controlled apparatus 17 operate under the software to execute the following processes.

The control apparatus 25 and controlled apparatus 17 connected to LAN 1 (hereinafter, generally referred to as "LAN connection apparatus") force certain storage media (for example, memories) to store the IP addresses supplied from the IP allocation apparatus 12. Then, the LAN connection apparatus actively and in broadcast transmit data including the IP address and information indicative of having participated in the network (hereinafter, called "network participation advertising message") or transmit the network participation advertising message to all the other apparatus (for example, the other one or plurality of control apparatus 25) connected to the LAN 1 in response to the inquiry from those other apparatus. Thus, the apparatus that has received the network participation advertising message recognizes the LAN connection apparatus as UPnP devices. Then, the LAN connection apparatus receive the inquiries from all apparatus (for example, other one or plurality of control apparatus 25) that have received the network participation advertising message, and send a certain reply (for example, an alive message (a message indicating that the LAN connection apparatus are now operating) including their own MAC addresses) to those other apparatus. Thus, the LAN connection apparatus and the other apparatus (for example, the other control apparatus 25) can intercommunicate with each other.

The control apparatus 25 has a cache memory 22 and a command generator 24.

The cache memory 22 is, for example, a nonvolatile memory (for example, EEPROM). In the cache memory 22 are stored, for example, the MAC (Media Access Control) address of the controlled apparatus 17 that was supplied from the controlled apparatus 17 during the process flow which will be described later, and the IP address (not shown) received when the network participation advertising message was transmitted.

The command generator 24 is hardware, software or a combination of them for generating various commands to control the controlled apparatus 17. The command generator 24 generates, for example, a magic packet 33 for turning on the power supply to the controlled apparatus 17 (typically, the main power supply to the apparatus 17 itself) or a power-off command 34 for turning off the power supply to the apparatus. The magic packet 33 includes the MAC address of the controlled apparatus 17 to which the power supply is desired to be turned on and a code indicating the command to turn on the power supply as illustrated. The power-off command, though not shown, is substantially the same as the command for, for example, OS (Operating System) to sleep or shut down, which is issued when the IP address of the controlled apparatus 17 to which the power is to be turned off is specified.

The controlled apparatus 17 has a main body 39, a power supply 41, a power switch unit 40, and a LAN card 31 according to WOL technique.

The main body 39 is formed of software, hardware or a combination of them in order to fulfill the function of controlled apparatus 17. If the controlled apparatus is, for example, the hard disk recorder 7, the main body 39 has hard disks for storing contents, a computer program for controlling the hard disks to be driven, a ROM for storing this computer program, and CPU that reads out the computer program from the ROM and executes the program to control the hard disks.

The power supply 41 supplies power to a network control IC 35 and to the main body 39 through the power switch unit 40. Thus, the network control IC 35 is always powered, and the main body 39 is powered or not by the power switch unit 40 (the network control IC 35 may be powered by another power supply not shown). The power supply 41 may be, for example, an internal power resources such as a charging battery or a power power supply circuit that reduces and rectifies the voltage from the commercial power supply.

The power switch unit 40 electrically connects or disconnects the main body 39 to or from the power supply 41 (that is, turns on or off the source voltage to the main body 39). The power switch unit 40 has a manual switch and a remote switch. The manual switch is manually turned on or off, while the remote switch is turned on or off by a control signal from the network control IC 35 as will be described later. This power switch unit 40 is constructed so that, for example, the source voltage to the main body 39 can be turned on and off by either the manual switch or the remote switch. For example, the power switch unit 40 may be constructed so that after the main body 39 is powered by turning the manual switch on, closing the remote switch can turn off the source voltage to the main body 39. In addition, for example, the power switch unit 40 may be constructed so that unless the manual switch is in the on state, the remote switch cannot be turned on or off.

The LAN card 31 has a recording medium such as ROM 37, and the network control IC 35.

The ROM 37 has stored therein information from which the controlled apparatus 17 can be identified, or one or a plurality of different kinds of invariable controlled-apparatus identifying information that are not dynamically changed, for example, one MAC address.

The network control IC 35 is a circuit for controlling the communications between the control apparatus 25 and the controlled apparatus 17 that has this LAN card 31 mounted thereon. For example, the network control IC 35 responds to an inquiry from the control apparatus 25 to reads out the MAC address stored in ROM 37, and sends it to the control apparatus 25. The network control IC 35 also receives the magic packet 33 from the control apparatus 25, interprets it and transmits to the power switch unit 40 a switch-on control signal for making the remote switch in the on state. In addition, the network control IC 35 receives the power-off command 34 from the control apparatus 25, interprets it and transmits to the power switch unit 40 a switch-off control signal for making the remote switch (not shown) in the off state. Moreover, the network control IC 35, when receiving the other control command (for example, an instruction to play the contents of moving picture stored within the hard disks when the controlled apparatus 17 is the hard disk recorder 7), transmits it as it is or converts it into a command of a certain format and then transmits this command via a prescribed communication line 38 to the main body 39. Also, the network control IC 35 receives the contents from the control apparatus 25 and transmits them to the main body 39, and/or it responds to a request from the control apparatus 25 to receive the contents from the main body 39 and transmit them to the control apparatus 25.

Figure 3:
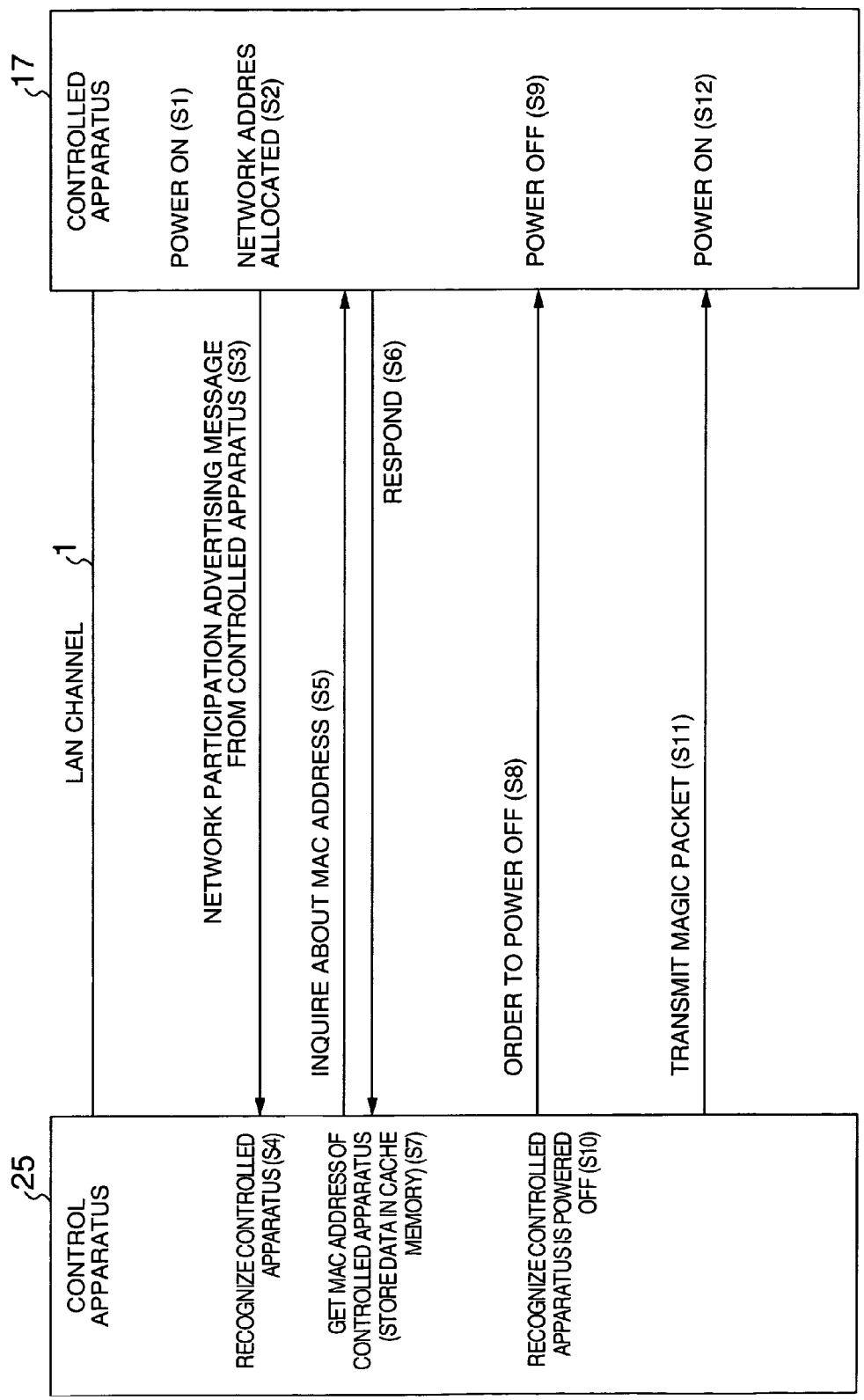
FIG. 3 shows a flow of processes for control apparatus 25 to control the power to the controlled apparatus 17.

The process flow in which the control apparatus 25 controls the power supply to the controlled apparatus 17 will be described with reference to FIG. 3.

The controlled apparatus 17, when newly connected to the home LAN 1 and powered on (step S1), is given an IP address from the IP address allocation apparatus 12 (S2). The controlled apparatus 17 transmits on a broadcast basis the above-mentioned network participation advertising message including this IP address via the home LAN 1 (S3).

The control apparatus 25 receives the network participation advertising message via the home LAN 1 and identifies the controlled apparatus 17 that has sent the message from the IP address included in the network participation advertising message (S4). Then, the control apparatus 25 sends an inquiry for MAC address to the identified controlled apparatus 17 (S5).

The network control IC 35 of the controlled apparatus 17 receives the inquiry of MAC address from the control apparatus 25, and it is responsive to it to read out the MAC address from the ROM 37 of LAN card 31, and transmits the MAC address to the control apparatus 25 (S6).

The control apparatus 25 receives the MAC address from the controlled apparatus 17 and stores the MAC address in the cache memory 22 (the MAC address may be registered in the cache memory 22 or a prescribed file provided in the hard disks) (step S7).

Later, when the control apparatus 25 receives a power-off request from the user, the control apparatus 25 is responsive to this request to generate the power-off command 34 including the IP address of controlled apparatus 17, and transmits it to the controlled apparatus 17 (S8).

When the network control IC 35 of controlled apparatus 17 receives the power-off command 34 from the control apparatus 25, it transmits a switch-off control signal to the power switch unit 40, thus turning off the source voltage to the main body 39 (S9).

The control apparatus 25 recognizes that the power supply to the controlled apparatus 17 is in the off state (S10). Specifically, the control apparatus 25 recognizes that the power supply to the controlled apparatus 17 is in the off state when at least one of the following three cases (1)~(3), for instance, occurs:

(1) when the power-off command 34 is transmitted to the controlled apparatus 17;
(2) when the power-off command 34 is received or when a notice of power-off state is received from the controlled apparatus 17 in which the power switch is manually turned off by the user; and
(3) when a reply signal meaning that the apparatus is powered off is received from the controlled apparatus 17 in response to an inquiry about power state after the inquiry is transmitted to the controlled apparatus 17 or when any reply signal is not received yet a constant time after the inquiry of power state is transmitted to the controlled apparatus 17.

Later, when the control apparatus 25 receives a power-on request from the user, the command generator 24 responds to this request to read out the MAC address of controlled apparatus 17 from the cache memory 22, generate the magic packet 33 including the MAC address and transmit the magic packet 33 to the controlled apparatus 17 (S11).

The network control IC 35 of controlled apparatus 17, when receiving the magic packet 33 from the control apparatus 25, examines if the MAC address within the magic packet 33 coincides with the MAC address within the ROM 37. If they coincide with each other, the network control IC 35 sends the switch-on control signal to the power switch unit 40, thus turning on the power supply to the main body 30 (S12).

We have described the process flow in which the control apparatus 25 controls the power supply to the controlled apparatus 17.

The examination of if the LAN connection apparatus is the control apparatus 25 or the controlled apparatus 17 depends upon the presence or absence of a prescribed function or, for example, a service according to the UPnP standard (hereinafter, referred to as "UPnP service") provided in the LAN connection apparatus.

Specifically, if the LAN connection apparatus is, for example, the control apparatus 25, the LAN connection apparatus, after sending the network participation advertising message, transmits an inquiry signal about service description in prescribed timing (for example, at the time of UPnP connection), and receives a service description provided in response to that signal (in other words, it collects information of UPnP service of other apparatus connected to the LAN 1). In addition, the LAN connection apparatus transmits, in addition to that inquiry signal, information of "recognizable as UPnP device but not having UPnP service". Thus, the apparatus that have received the inquiry signal and the additional information recognizes that the source of the transmission of the inquiry is the control apparatus 25.

If the LAN connection apparatus is, for example, the controlled apparatus 17, the LAN connection apparatus sends the service description on the LAN 1 in certain timing (for example, at the time of UPnP connection or when the inquiry signal about service description is received) after sending the network participation advertising message, thereby notifying that the LAN connection apparatus itself is the "controlled apparatus having UPnP service". Thus, the apparatus that have received the service description can recognize that the source of the transmission is the controlled apparatus. The term "service description" is detail information about the controlled apparatus 17 (for example, information about effective action or state information about ability).

The LAN connection apparatus may have the ability to selectively play one of both the roles of the control apparatus and controlled apparatus. In that case, the switching between the control apparatus and the controlled apparatus can be made on software basis. Specifically, the LAN connection apparatus has, for example, control apparatus software for playing the role of the control apparatus, controlled apparatus software for playing the role of the controlled apparatus and UPnP middle software that receives and interprets the command from other apparatus via a host application or network. The UPnP middle software selects the control apparatus software or the controlled apparatus software on the basis of the result of interpreting the received command, and informs the selected one of the contents of the received command.

In this LAN connection apparatus, the same processing as that made when the control apparatus is connected to the LAN 1 is executed in certain timing to the other apparatus connected to the LAN 1, and the same processing as that made when the controlled apparatus is connected to the LAN 1 is carried out to the other apparatus in the same or other timing. Thus, the other apparatus understands that this LAN connection apparatus "receives a command to request for the UPnP service from itself (from the other apparatus), but also transmits a command to request for the UPnP service to the other apparatus".

The function for the control apparatus 25 to get the contents from the controlled apparatus 17 will be described with reference to FIG. 4. In the following description, it is assumed that the control apparatus 25 is a personal computer (hereinafter, called "PC client") 3, the controlled apparatus 17 is the HDD recorder 7, and the contents are a moving picture file.

In the illustrated example, the PC client 3 serves as a client, and the HDD recorder 7 functions as a server, or a server-client relation is established.

The PC client 3 has contents file audiovisual software 51 for playing the moving picture file (of, for example, MPEG type), contents client function software 53 for requesting the HDD recorder 7 to transfer the moving picture file, and contents file receiving software 55 for receiving the moving picture file in response to that request.

The HDD recorder 7 has contents server function software 57 for receiving the request to transfer the moving picture file, and contents file transmission software 59 for transmitting the requested moving picture file to the PC client 3.

In this example, the PC client 3 is able to get the moving picture file the user desires from the HDD recorder 7 during the following process flow.

The user operates the contents file audiovisual software 51 to browse a list of one or a plurality of moving picture files stored in the hard disks the HDD recorder 7 has, and selects a desired moving picture file from the list. The contents file audiovisual software 51 notifies the contents client function software 53 of the moving picture file the user has selected. The contents client function software 53 transmits to the HDD recorder 7 a command to transfer the selected moving picture file (S21).

The contents server function software 57 of HDD recorder 7 receives the command to transfer the moving picture file, and orders the contents file transmission software 59 to send the moving picture file according to the transfer command (S22). The contents file transmission software 59 gets this moving picture file from the hard disks, and transfers it to the PC client 3 (S23).

The contents file transmission software 55 of PC client 3 receives the moving picture file, and orders the contents file audiovisual software 51 to make it be stored in a certain storage medium (for example, RAM) and play the stored moving picture file (S24). The contents file audiovisual software 51 plays the moving picture file according to the play command, or the moving picture file stored in the certain storage medium by the contents file receiving software 55.

The contents file audiovisual software 51 is responsive to the user's operations to transmit contents file operation commands (to, for example, play, stop, pause or fast-forward the moving picture file or bring back to the beginning end of the file) corresponding to the operations to the contents file receiving software 55. The software 55 forces the moving picture file to be operated on the software 51 according to the received commands.

We have described the first embodiment as above. The MAC address of controlled apparatus 17 may be stored in any storage medium if the storage medium can communicate with the network control IC 35.

According to the first embodiment, the controlled apparatus 17 transmits the allocated IP address to the control apparatus 25, and the control apparatus 25 requests the controlled apparatus 17 having that IP address to send the MAC address. The network control IC 35 of controlled apparatus 17 responds to this request to get the MAC address from the ROM 37 where it is stored, and sends the MAC address to the control apparatus 25. The control apparatus 25 makes the MAC address from the controlled apparatus 17 be stored in the cache memory 22. By a sequence of processes, it is possible that the MAC address of controlled apparatus 17 is automatically stored in the control apparatus 25.

Second Embodiment

The second embodiment will be described. The second embodiment is an example in which the control apparatus 25 controls the power supplies of a plurality of controlled apparatus 17 in the system mentioned about the first embodiment. Therefore, the second embodiment will be described below with reference to FIGS. 1 and 2 appropriately (this reference will also be applied to the third embodiment and the following).

In the second embodiment, the control apparatus 25 manages a plurality of controlled apparatus 17. The mechanism for this management will be mentioned with reference to FIG. 5.

Figure 5:
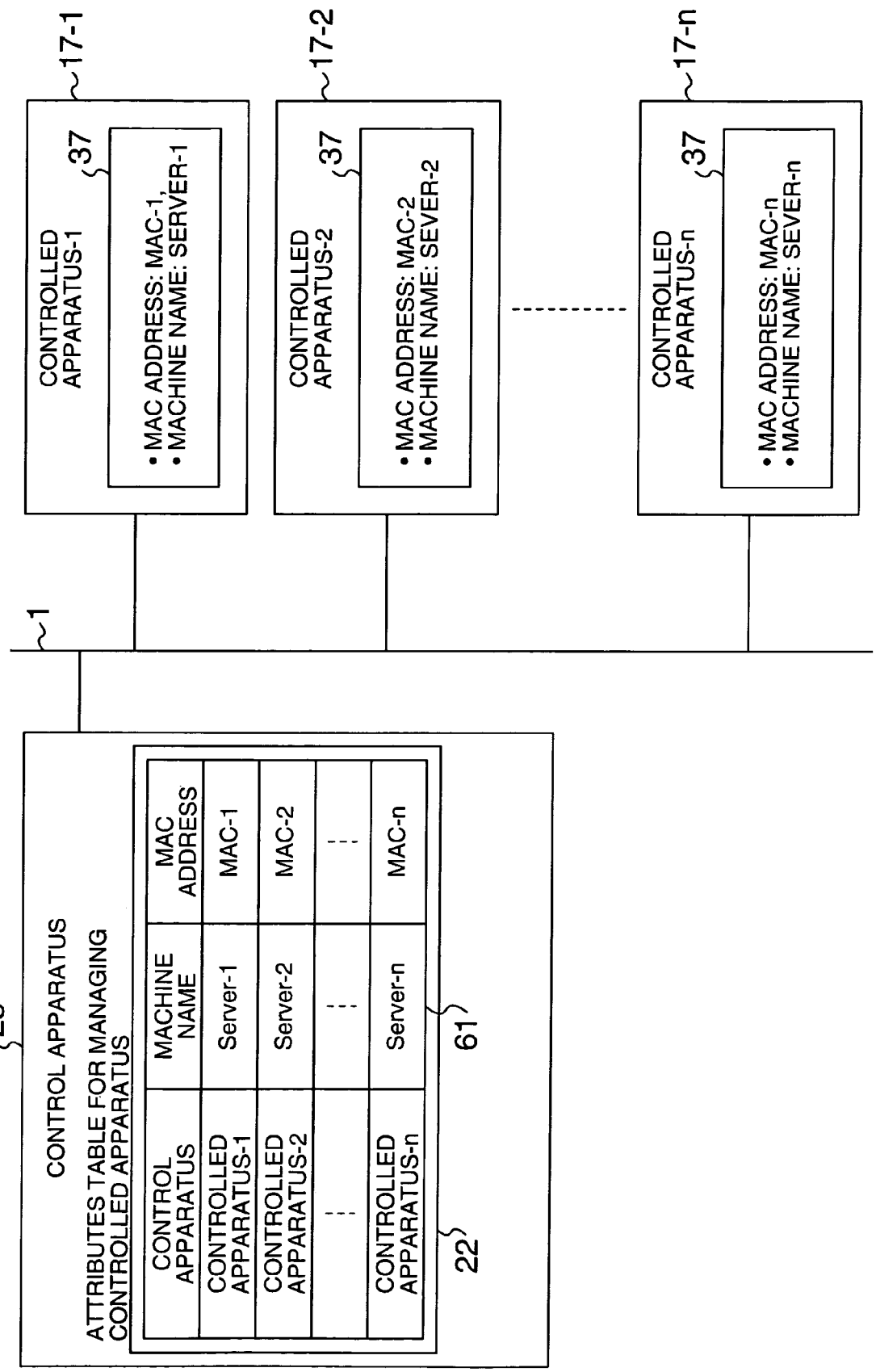
FIG. 5 shows the control apparatus 25 and a plurality of controlled apparatus 17 in the second embodiment of the invention.

As illustrated in FIG. 5, the home LAN 1 connects n (n is an integer of 2 or above) controlled apparatus 17-1 through 17-n. Since any controlled apparatus has the same characteristics, the controlled apparatus 17-n will be described as a typical example. The ROM 37 (which may be a storage medium of another type) of the LAN card 31 mounted on the controlled apparatus 17-n has stored therein the MAC address and the machine name of controlled apparatus 17-n.

The cache memory 22 of control apparatus 25 has an attribute table (hereinafter, called the controlled-apparatus management table) 61 composed for managing the controlled apparatus 17-1 through 17-n. The controlled-apparatus management table 61 has an apparatus code (written as, for example, "controlled apparatus-n"), a machine name (written as, for example, "Server-n"), and a MAC address (written as, for example, "MAC-n") registered for each of the controlled apparatus 17-1 through 17-n. The apparatus code is, for example, a code determined by the control apparatus 25.

Figure 6:
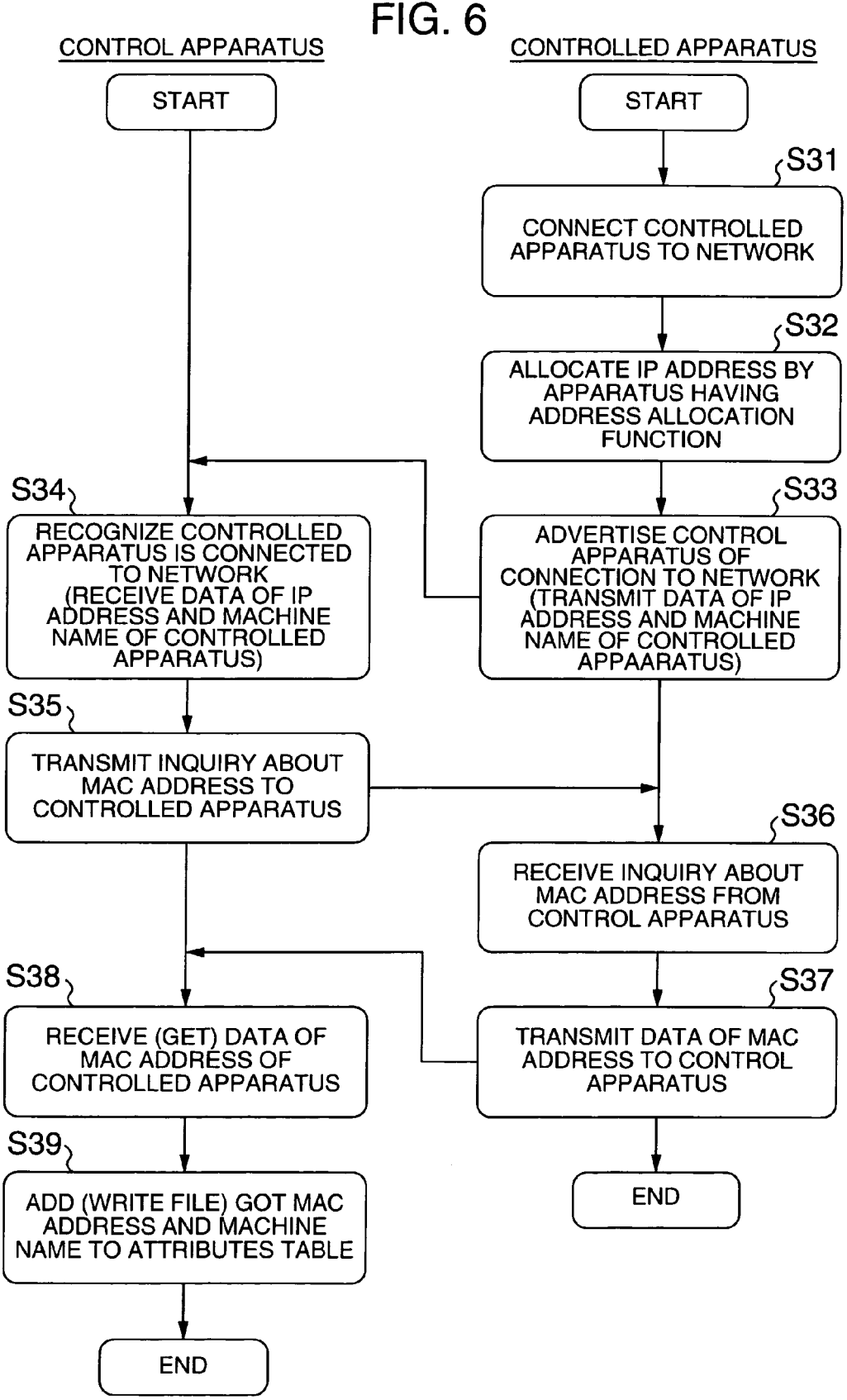
FIG. 6 is a flowchart for processes in which sets of the MAC addresses and machine names of the controlled apparatus connected afresh to the LAN 1 within a home are registered in the controlled-apparatus management table 61.

A description will be made of the process flow in which a set of MAC address and machine name of the controlled apparatus newly connected to the home LAN 1 is registered in the controlled-apparatus management table 61 with reference to FIG. 6.

When the controlled apparatus 17-n is connected to the home LAN 1 (S31), the IP address allocation apparatus 12 gives it an IP address (S32). The network control IC 35 of controlled apparatus 17-n reads out the machine name from the ROM 37 in prescribed timing (for example, immediately after the step S32), and transmits in broadcast the network participation advertising message that includes the machine name and the IP address assigned in step S32 (or in response to an inquiry from the control apparatus 25, it transmits the network participation advertising message to the control apparatus 25) (S33).

The control apparatus 25 receives the network participation advertising message, and makes at least the machine name of the network participation advertising message be temporarily stored in a certain storage medium (for example, memory). In addition, the control apparatus 25 recognizes the controlled apparatus 17-n newly connected to the home LAN 1 from the IP address included in the network participation advertising message (S34). Then, the control apparatus 25 sends an inquiry for MAC address to the recognized controlled apparatus 17-n (S35).

The network control IC 35 of controlled apparatus 17-n, when receiving the inquiry about MAC address from the control apparatus 25 (S36), gets the MAC address from the ROM 37, and transmits the MAC address to the control apparatus 25 (S37).

The control apparatus 25 receives the MAC address from the controlled apparatus 17-n (S38). Then, the control apparatus 25 keeps an information registration area for the controlled apparatus 17-n on the controlled-apparatus management table 61, and writes a set of the apparatus code, the received MAC address and the temporarily stored machine name in this area on the table (S39).

When the above process flow is thus executed, information of the controlled apparatus newly connected to the home LAN 1 is added to the controlled-apparatus management table 61.

Incidentally, in the second embodiment the control apparatus 25 also manages how the controlled apparatus and the contents are stored in association with each other. The mechanism for this purpose will be described with reference to FIG. 7.

Figure 7:
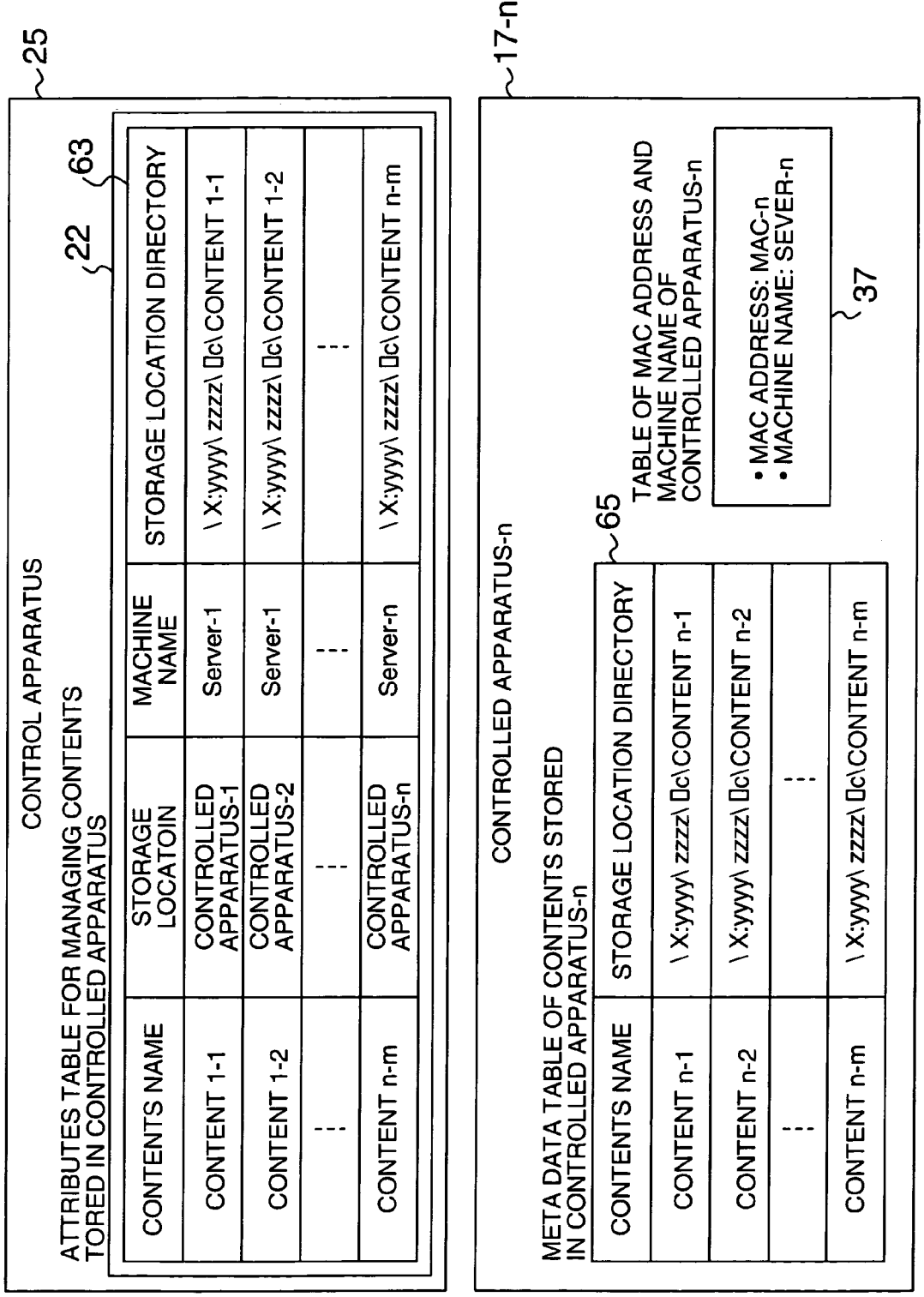
FIG. 7 is a diagram to which reference is made in explaining how the control apparatus 25 manages contents stored in the control apparatus 17 in the second embodiment of the invention.

As illustrated in FIG. 7, a content meta data table 65 is composed in a prescribed storage medium (for example, memory or hard disks) owned by the controlled apparatus 17-n. The contents meta data table 65 has a set of attributes of one or multiple contents, for example, contents identification information (for example, contents name) and contents storage directory (that is, the path through which the contents can be got) stored in a certain storage medium (for example, hard disks) that the controlled apparatus 17-n has.

The cache memory 22 of the control apparatus 25 has composed therein an attribute table (hereinafter, called contents management table) 63 for managing how the controlled apparatus and the contents are stored in association with each other. The contents management table 63 has registered therein the names of the contents stored in the controlled apparatus 17-1 through 17-n, those apparatus in which those contents are stored, the machine names of those apparatus, and the directories at which those contents are stored.

A description will be made of one example of the process flow in which the contents management table 63 is updated.

The controlled apparatus 17-n, when contents are newly stored in a prescribed storage medium, registers a set of the contents name and the contents-stored directory in the contents meta data table 65. When contents are deleted from the prescribed storage medium, the controlled apparatus 17-n eliminates the set of the contents name of the contents and the contents-stored directory from the contents meta data table 65. When contents are newly stored in a certain storage medium at regular intervals or irregular intervals and/or deleted from the certain storage medium, the controlled apparatus 17-n transmits the meta table information about the contents meta table 65 to the control apparatus 25. The meta table information is, for example, one of the following three pieces of information (1) through (3):

(1) all information stored in the contents meta table 65;
(2) information containing the fact that contents are newly added to the controlled-apparatus management table 61 and a set of the name of the added contents and the contents-stored directory; and
(3) information containing the fact that a set of a contents name and contents-stored directory is deleted from the controlled-apparatus management table 61, and a set of the name of the deleted contents and the directory.

The control apparatus 25 may send an inquiry for meta table information to the controlled apparatus registered in the controlled-apparatus management table 61 at regular intervals or irregular intervals and receive meta table information in response to the reply or may receive meta table information voluntarily provided from the controlled apparatus 17 without inquiry. The control apparatus 25, when receiving meta table information from the controlled apparatus 17-1 through 17-n, gets from the controlled-apparatus management table 61 the apparatus identification records (for example, apparatus codes and machine names) corresponding to the controlled apparatus that sent the meta table information. Then, the control apparatus 25 updates the contents management table 63 by using the meta table information and the got records. If the meta table information is, for example, the above information (1), the control apparatus 25 once eliminates the record corresponding to the got apparatus identification record from the contents management table 63, and subsequently writes the received meta table information and the above-got apparatus identification record in one-to-one relation in the contents management table 63. In addition, if the meta table information is the above information (2), the control apparatus 25 adds the received meta table information to the contents management table 63 in association with the got apparatus identification record. If the meta table information is the information (3), the control apparatus 25 searches the contents management table 63 for the information coincident with the received meta table information on the basis of the got apparatus identification record, and eliminates the detected information from the table 63.

Figure 8:
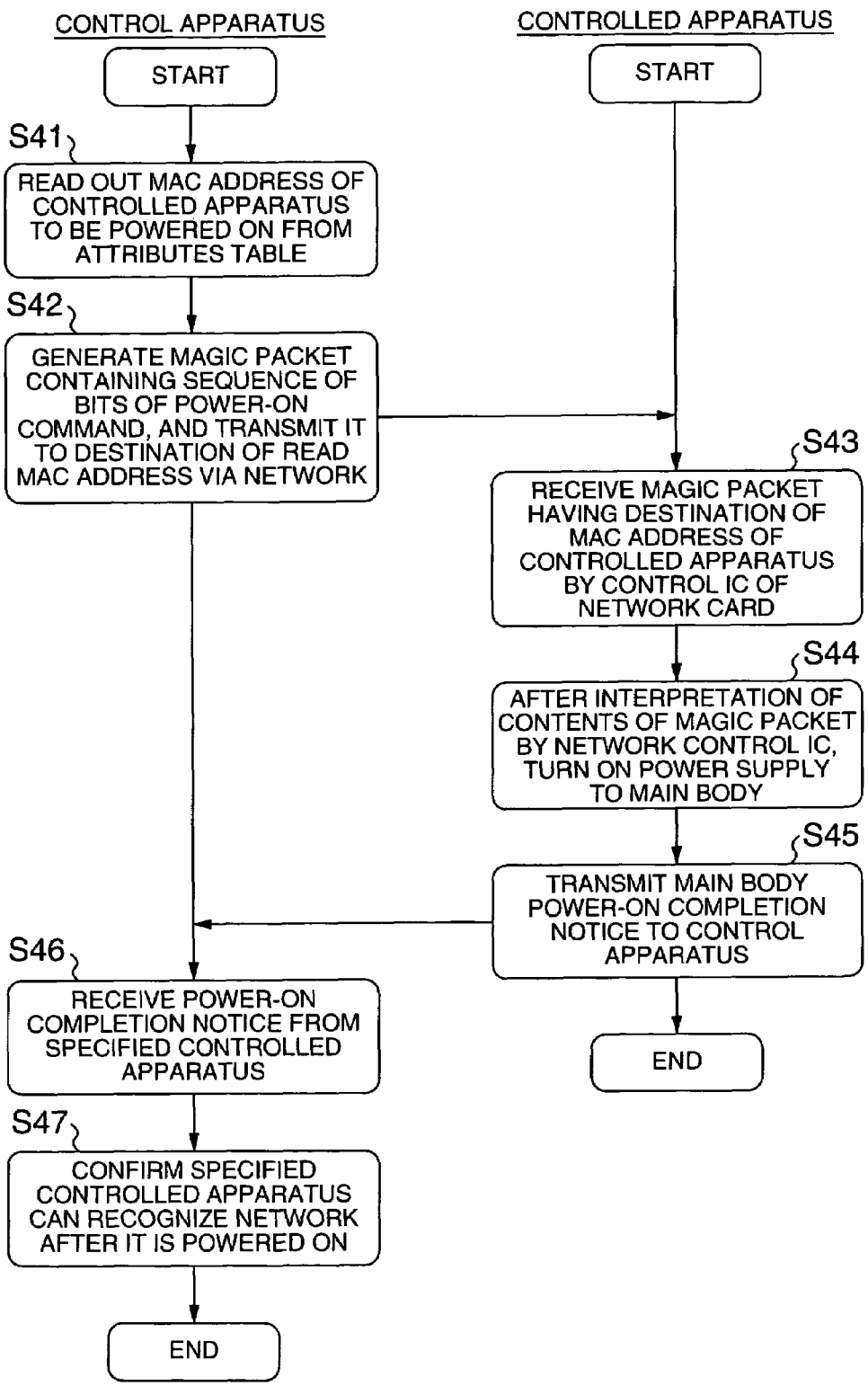
FIG. 8 is a flowchart of processes in which the controlled apparatus 17 are controlled in their power supplies in the second embodiment of the invention.

In this second embodiment, the power supplies to the controlled apparatus 17 are controlled in the process flow shown in FIG. 8.

The control apparatus 25 is responsive to a prescribed operation by the user to make its own display to indicate a list of, at least, machine names of the table 61 on the basis of the controlled-apparatus management table 61 registered in the cache memory 22. The control apparatus 25, when a machine name of the apparatus the user desires to turn on is selected from the list, reads out the MAC address corresponding to that machine name from the controlled-apparatus management table 61 (S41). Then, the control apparatus 25 generates the magic packet 33 containing the read MAC address, and sends the magic packet 33 to the home LAN 1 (S42).

The magic packet 33 sent in step S42 is received by the network control IC 35 of the controlled apparatus 17-n that has the MAC address contained in the magic packet (S43). In that case, the network control IC 35 interprets the contents of the received magic packet 33, transmits the switch-on signal resulting from the interpretation to the power switch unit 40 of main body 39, thus turning on the power supply to the main body 39 (S44). Then, the network control IC 35 generates a power-on completion notice that the power supply to the main body 39 has been turned on, and sends it to the control apparatus 25 that has sent the magic packet 33. (S45).

The control apparatus 25 receives the power-on completion notice (S46) and recognizes that the controlled apparatus 17-n the user desired to turn on has been powered so as to recognize the network (S47).

Thus, according to the second embodiment mentioned above, the control apparatus 25 is able to manage a plurality of controlled apparatus 17-1 through 17-n, and the user of the control apparatus 25 can operate the control apparatus 25 and remotely control the multiple controlled apparatus 17-1 through 17-n managed by the control apparatus 25 to be powered on and off.

In addition, according to the second embodiment, the control apparatus 25 is able to manage about what contents are stored in the corresponding controlled apparatus.

The second embodiment can be modified as follows.

For example, in a modification 1 of the second embodiment, the network control IC 35 of the controlled apparatus, when receiving the magic packet 33, examines if the MAC address contained within the received magic packet 33 coincides with the MAC address stored in the ROM 37. Only if they coincide with each other, the network control IC 35 turns on the power supply to the main body 39. If they do not coincide, it makes a given error process.

In a modification 2 of the second embodiment, the control apparatus 25 in at least one of the second embodiment and its modification 1 sends an inquiry to the controlled apparatus registered in the management table 61 at regular intervals or irregular intervals a prescribed number of times until a reply is received. In this case, if no reply signal is obtained after the repetition of inquiry, the control apparatus 25 may eliminate the record corresponding to that controlled apparatus from the controlled-apparatus management table 61 and/or the contents management table 63. Thus, the records of the controlled apparatus disconnected from the home LAN 1 can be automatically eliminated so that the memory capacity cost can be cut down.

In a modification 3 of the second embodiment, the controlled-apparatus management table 61 and/or contents management table 63 in at least one of the second embodiment and the modifications 1, 2 of the second embodiment may be constructed not in the cache memory 22, but on another storage medium (for example, a memory or hard disks of other kinds).

In a modification 4 of the second embodiment, the controlled-apparatus management table 61 in at least one of the second embodiment and the modifications 1 through 3 of the second embodiment may have registered therein the on state or off-state of the power supply to each controlled apparatus. In that case, for example, the network control IC 35 of the controlled apparatus, when turning on and/or off the power supply to the main body 39, notifies the control apparatus of this fact, and the control apparatus 25 is responsive to this notice to cause the on-state or off-state of the power supply to the controlled apparatus that sent the notice to be registered in the management table 61. The control apparatus 25, when displaying a list of machine names of controlled apparatus, adds the power status of each controlled apparatus to the list. Thus, the user of control apparatus 25 can instantly recognize if the power supplies to the controlled apparatus are in the on-state or off-state.

In a modification 5 of the second embodiment, the controlled-apparatus management table 61 in at least one of the second embodiment and the modifications 1 through 4 of the second embodiment also has registered therein the situations in which the controlled apparatus are connected in association with each other. The control apparatus 25, when displaying the list of machine names, may also add the situations in which the controlled apparatus are connected in association with each other. In addition, the control apparatus 25 may display a list from which the user can select two or more machine names of the apparatus that the user wants to power on and/or off. In this case, the control apparatus 25 may transmit the magic packet 33 and/or power-off command 34 to the two or more controlled apparatus having the two or more machine names selected by the user. Therefore, the user can turn on and/or turn off the power supplies of the two or more controlled apparatus (for example, projector 15 and HDD recorder 7 or VTR 9 and video camera 11) connected to each other substantially at same time.

Moreover, in a modification 6 of the second embodiment, the control apparatus 25 in at least one of the second embodiment and the modifications 1 through 5 of the second embodiment may display on its own display screen a contents list based on the contents management table 63 in which the machine names and the contents are stored in association with each other. In addition, the control apparatus 25 may specify through that list the contents that the user desires and accept a request to operate (for example, play) on the contents desired by the user. The control apparatus 25, when specifying contents or accepting the request to operate on the desired contents, perceives the controlled apparatus in which those contents are stored and the on-state or off-state of the power supply to that apparatus. If the power supply to this controlled apparatus is in the off state, it may display the off state on the display screen or automatically generate the magic packet 33 and send it to that controlled apparatus.

In a modification 7 of the second embodiment, all apparatus connected to the home LAN 1 in at least one of the second embodiment and the modifications 1 through 6 of the second embodiment may be served as the control apparatus or as the controlled apparatus. In that case, it is possible that, for example, the apparatus that the user orders to send an inquiry is automatically selected as the control apparatus, while the apparatus that received the inquiry automatically serves as the controlled apparatus. In addition, each apparatus may have the tables 61, 63 that the control apparatus 25 holds in order to function as the control apparatus.

Third Embodiment

The third embodiment will be described below. In this third embodiment, one controlled apparatus 17-1 in the system mentioned about the first and second embodiments is connected to another controlled apparatus 17-2 (or other plurality of apparatus) and controls the power supply to the other controlled apparatus 17-2.

In the third embodiment, for example, the controlled apparatus 17-1 transmits a moving picture file (that may be replaced by other contents) to the controlled apparatus 17-2 in response to the command from the control apparatus 25.

Figure 9:
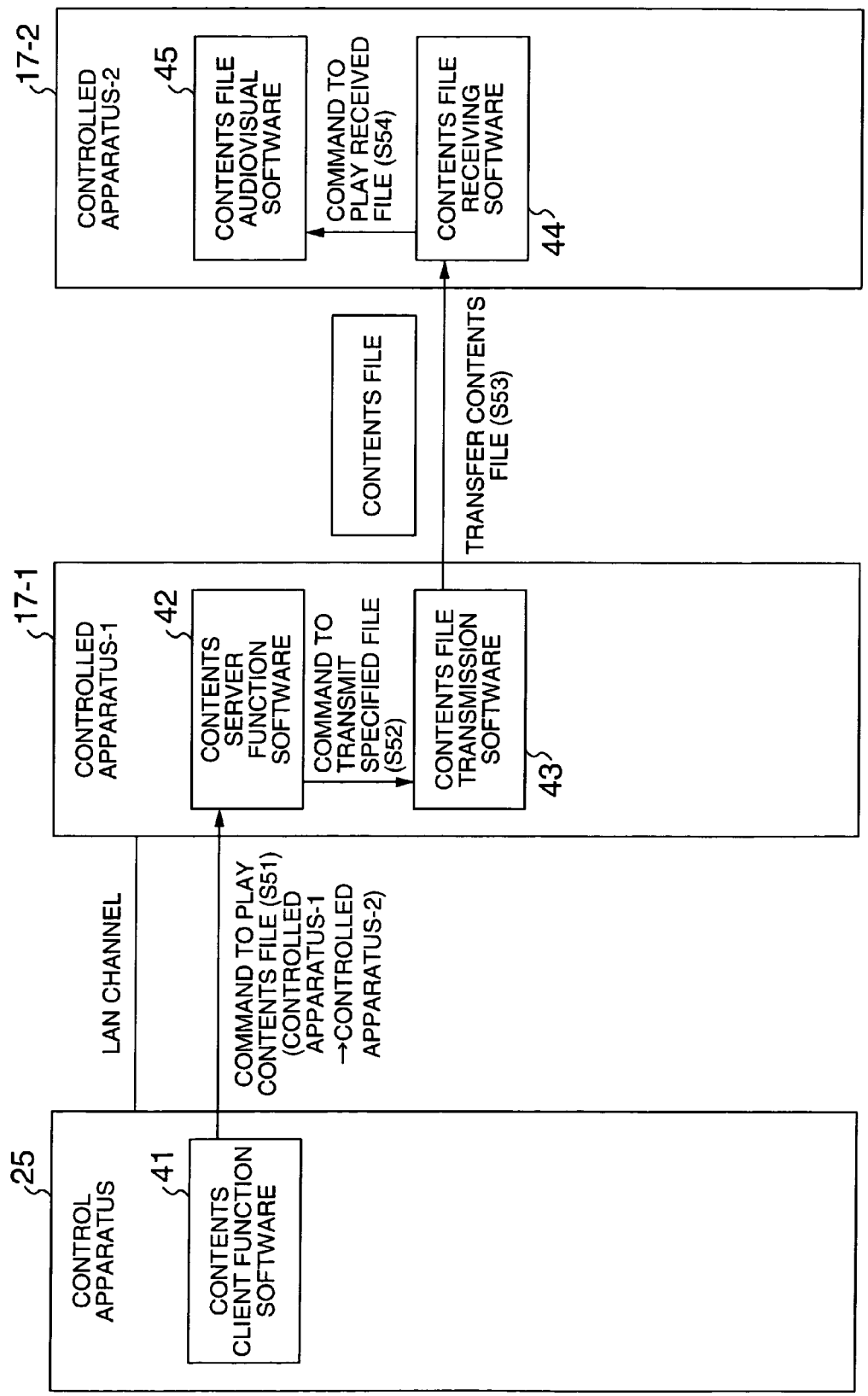
FIG. 9 shows the control apparatus, controlled apparatus 17-1 and controlled apparatus 17-2 in the third embodiment of the invention.

FIG. 9 shows the control apparatus 25, and controlled apparatus 17-1, 17-2 according to the third embodiment of the invention.

Figure 4:
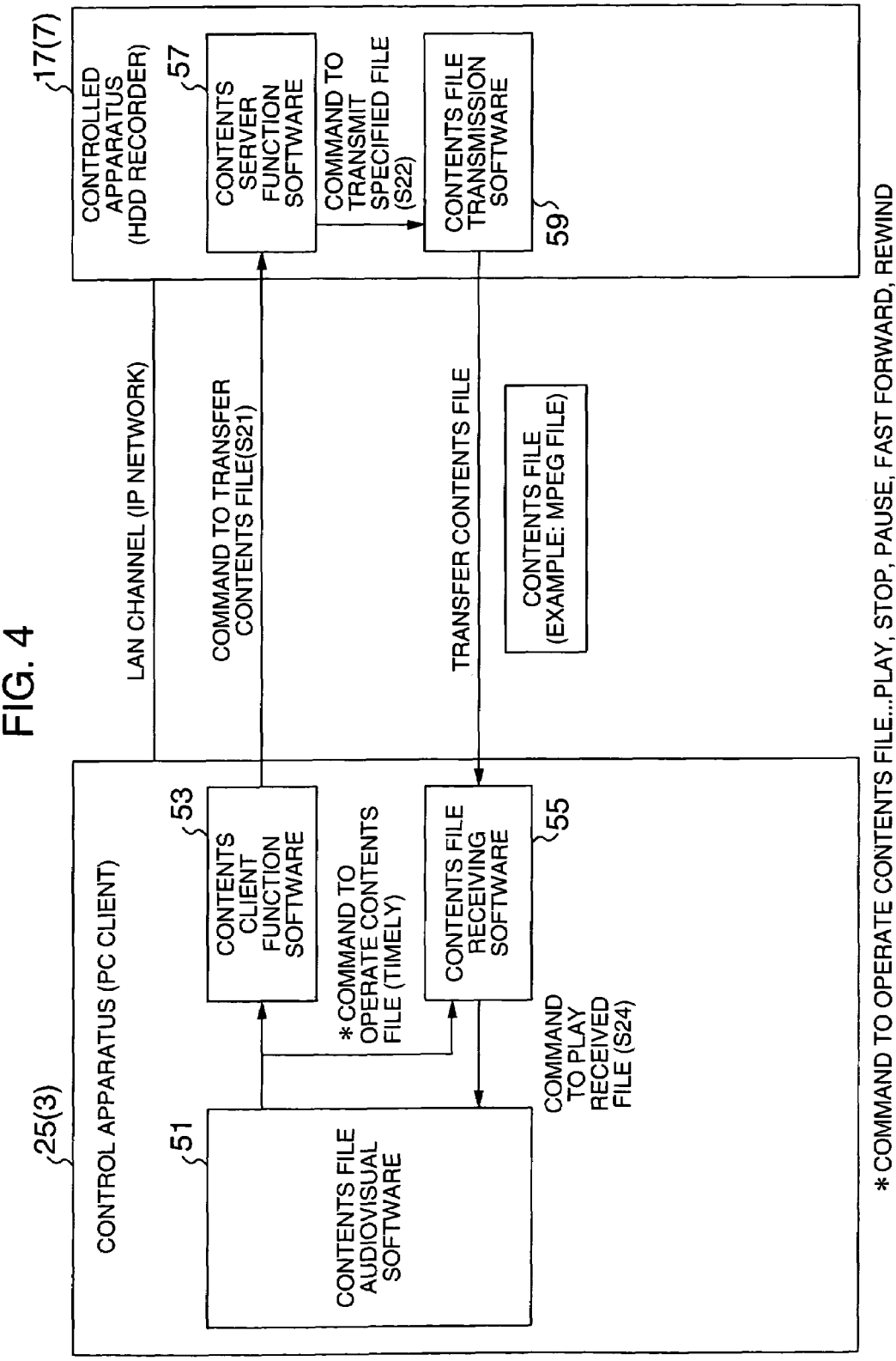
FIG. 4 shows software provided in the control apparatus 25 and controlled apparatus 17, and transfer routes for contents.

In this third embodiment, software of various kinds mentioned with reference to FIG. 4 is provided as follows.

In other words, as illustrated in FIG. 9, contents client function software 41 is incorporated in the control apparatus 25 (for example, PC client 3). In addition, contents server function software 42 and contents file transmission software 43 are installed in the controlled apparatus 17-1 (for example, HDD recorder 7). Also, the contents-file receiving software 44 and contents-file audiovisual software 45 are loaded in the controlled apparatus 17-2 (for example, projector 15).

In this third embodiment, the moving picture file is played by the following process flow.

The control apparatus 25 displays on its display screen a contents list (list of contents names and machine names of controlled apparatus) showing what contents are stored in the corresponding controlled apparatus. The user designates a desired moving picture file from the contents list. In this case, the contents client function software 41 loaded in the control apparatus 25 refers to the contents management table 63, knows the file name of the specified moving file and the controlled apparatus 17-1 in which this moving picture file is stored, and transmits to the controlled apparatus 17-1 a contents-file play command to play that moving picture file (S51).

The contents server function software 42 of the controlled apparatus 17-1 receives and interprets the contents-file play command, and recognizes the file name of the moving picture file desired by the user. In addition, it refers to the contents meta data table 65 and knows the apparatus that has stored therein the name of the moving picture file. The contents server function software 42 notifies the contents file transmission software 43 of the perceived file name and the corresponding apparatus, and orders it to transfer the moving picture file of this file name to the controlled apparatus 17-2 connected to this controlled apparatus 17-1 (S52). The contents file transmission software 43 responds to this command to get the moving picture file of the notified file name from the informed apparatus, and transfers it to the controlled apparatus 17-2 (S53).

The contents file receiving software 44 of the controlled apparatus 17-2 receives the moving picture file from the controlled apparatus 17-1, and orders the contents file audiovisual software 45 to play the moving picture file (S54). The contents file audiovisual software 45 responds to this instruction to play the received moving picture file. Thus, the user of the controlled apparatus 17-2 is able to view the moving picture of the file.

In the process flow, the control apparatus 25 may also accept the apparatus to which the designated contents are transferred. In this case, the contents file play command transmitted in step S51 contains information (for example, MAC address or IP address) of the apparatus to which the contents are transferred. The controlled apparatus 17-1 that has received the contents file play command interprets this command to know the moving picture file desired by the user, and transfers it to the desired controlled apparatus (which may be the control apparatus) recognized from the interpretation.

In this third embodiment, the controlled apparatus 17-1 that transfers the moving picture file serves as the master, while the controlled apparatus 17-2 that receives the moving picture file as the slave. At least one of the controlled apparatus 17-1, 17-2, for example, the controlled apparatus 17-1 as the master is able to detect the completion of the reproduction of the moving picture file by a certain process (for example, by receiving the reproduction completion notice from the controlled apparatus 17-2). Thus, the controlled apparatus 17-1 controls the power supply to itself and the power supply to the controlled apparatus 17-2 in the process flow that will be mentioned below.

Figure 10:
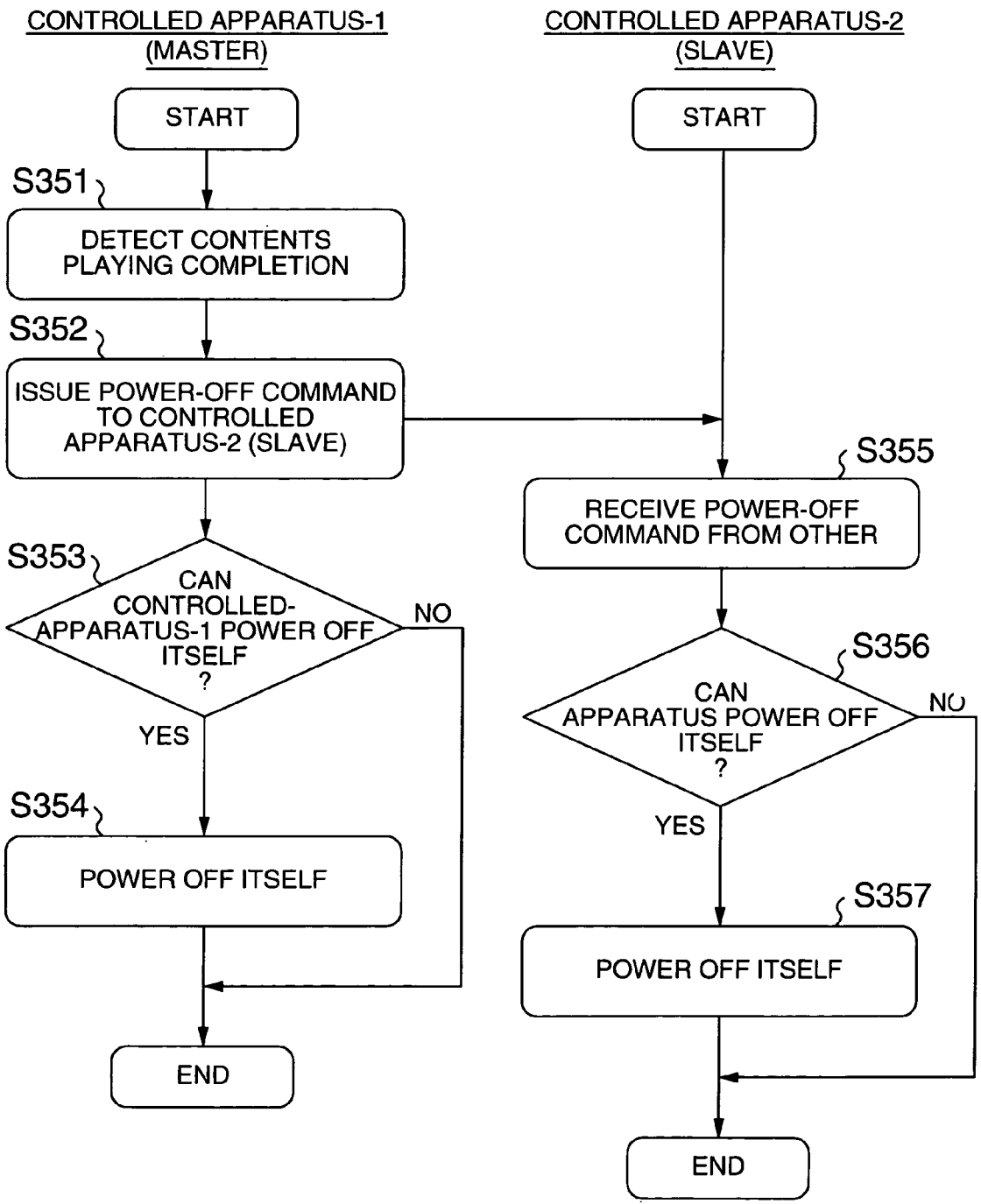
FIG. 10 is a flowchart of processes in which the controlled apparatus 17-1, 17-2 are controlled in their power supplies.

FIG. 10 is a flowchart of the power control process in the controlled apparatus 17-1, 17-2.

When the controlled apparatus 17-1 as the master detects the completion of the reproduction of the moving picture file (S351), it generates a power-off command, and transmits it to the controlled apparatus 17-2 connected to the master (S352).

Subsequently, the controlled apparatus 17-1 judges if its own power supply can be turned off (S353). If possible (YES in step S353), it turns off the power supply (S54). If not possible (NO in step S353), the power is kept in the on state.

The controlled apparatus 17-2 as the slave, when receiving the power-off command (S355), judges if its own power supply can be turned off (S356). If possible (YES in step S356), it turns off the power supply (S357). If not possible (NO in step S356), the power is kept in the on state.

The controlled apparatus 17-1 thus controls the power supply of itself and the power supply to the controlled apparatus 17-2 by the above process flow. The power-off command generated and transmitted in step 352 of this process flow may be, for example, provided via the home LAN 1 or a fixed exclusive line that connects the controlled apparatus 17-1, 17-2. The decision made in at least one of steps S353 and S356 is executed on the basis of, for example, the situations in which the corresponding apparatus is placed. Specifically, if the apparatus is being executing a certain process (for example, receiving data or processing a command from the user), it is judged that the power supply cannot be turned off. If the apparatus is simply not executing any process in the standby mode, it is judged that the power supply can be turned off.

Thus, according to the third embodiment, after the end of a prescribed process for contents (for example, after the completion of the reproduction of the moving picture file), the power supplies to one or a plurality of controlled apparatus that has processed the contents are automatically turned off. Thus, the power to the controlled apparatus can be saved.

In this third embodiment, we can consider the following modifications or applications.

For example, the controlled apparatus 17-1 as the master, after detecting that the process for the contents (for example, the completion of the reproduction of the moving picture file) has been completed, may generate a power-on command (for example, magic packet 33 or a command of a different kind) and send it to a certain one of control apparatus 25, thus turning on the power supply to this control apparatus 25, before the apparatus notifies the control apparatus 25 of the completion of the certain process on the contents. Then, the control apparatus 25 may respond to this notice to transmit the power-off command 34 to both the controlled apparatus 17-1 and the controlled apparatus 17-2 as the slave to that controlled apparatus, thus turning off the power supplies to those apparatus 17-1, 17-2. In either the third embodiment or this modification, the apparatus as the master can preferably detect the end of the prescribed process to the contents.

In addition, for example, it is assumed that the master and slave are HDD recorder 7 and video camera (for example, surveillance camera) 11, respectively, and that a video image produced from the video camera 11 is stored in the hard disks provided within the HDD recorder 7. In that case, it is possible that, if the HDD recorder 7 detects that the entire data storage region is completely or substantially filled with data so as not to store more data, the recorder 7 automatically turns off the power supplies to itself 7 and video camera 11 without informing the user of this fact or it turns off those power supplies by the above process when it informs the user of this fact and receives a certain command from the user.

Fourth Embodiment

The fourth embodiment of the invention will be described below. The fourth embodiment is the case in which, in the system described about the second embodiment, the control apparatus 25 designates one of a plurality of contents stored in the controlled apparatus 17-1 through 17-n, designates the controlled apparatus (for example, HDD recorder 7) that holds the designated content, turns on the power supply to this specified controlled apparatus 7, and reads out the specified content from the powered-on controlled apparatus 17.

FIG. 11 shows the controlled apparatus 17 in the fourth embodiment.

Each of the controlled apparatus 17-1 through 17-n, for example, the controlled apparatus 17-n has, in addition to the information mentioned in the section of second embodiment, a contents table 71-n stored in a prescribed storage medium (for example, memory or hard disks) composed within the apparatus or attached from the outside. The contents table 71-n has registered therein information about one or each of a plurality of contents stored in the controlled apparatus 17-n, for example, contents name, attributes (for example, file type), playing time length and storage location directory. The playing time length has a value larger than zero if the content is available for play such as a moving picture file or audio file, but zero if the content is not reproducible such as a still picture (for example, JPEG file) or document (for example, text file).

Each of the controlled apparatus 17-1 through 17-n transmits its own contents table 71 to the control apparatus.

FIGS. 12 and 13 show the control apparatus 25 in the fourth embodiment.

As illustrated in FIG. 12, the control apparatus 25 has, in addition to the information mentioned in the section of second embodiment, a plurality of contents tables 71-1~71-n received from a plurality of controlled apparatus 17-1~17-n and stored in a given storage medium (for example, cache memory 22 or hard disks) incorporated in itself or attached from the outside.

In addition, as illustrated in FIG. 13, the control apparatus 25 has, in addition to the information mentioned in the section of second embodiment, an index table 75 stored in a prescribed storage medium (for example, cache memory 22 or hard disks) composed in or attached from the outside. The index table 75 has recorded therein information of each of two or more contents of a plurality of contents tables 71-1~71-n stored in the control apparatus 25, for example, machine names of the apparatus that hold those contents, and names (or path names through which to reach the contents tables) of the contents tables in which the information about those contents is stored. This contents table 75 is made by using the contents names, machine names and contents table names taken out such that, for example, the control apparatus 25 gets a plurality of contents names from a plurality of contents tables 71-1~71-n, obtains machine names corresponding to the extracted multiple contents names from the contents management table 63 (see FIG. 7), and gets the name of the contents table having the extracted contents names.

The control apparatus 25 gets contents that the user desires by using the index table 75 in the following process flow.

Figure 14:
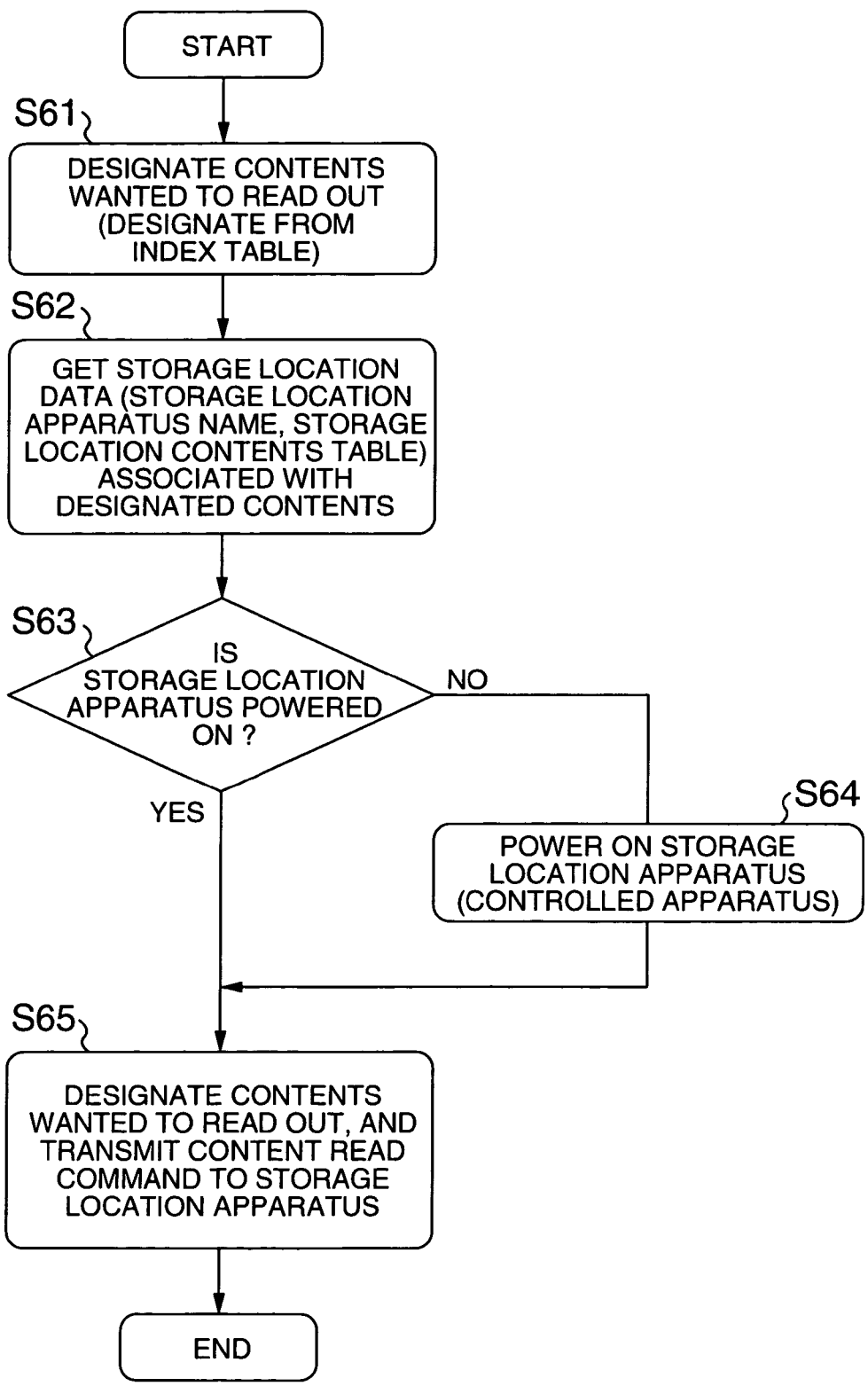
FIG. 14 is a flowchart of processes in which the control apparatus 25 gets contents the user desires by use of the index table 75.

FIG. 14 is a flowchart of an example of the process flow used for the control apparatus 25 to get the desired contents by use of the index table 75.

The control apparatus 25 is responsive to a given operation by the user to display on its own display screen a list of a plurality of contents information (for example, contents names, attributes, playing time lengths) registered in the index table 75. The control apparatus 25 accepts a desired contents name that the user designates from a plurality of contents names of the list (S61).

Then, the control apparatus 25 gets the storage location machine name and storage location contents table name associated with the designated contents information (for example, contents name) from the index table 75 (S62).

Thereafter, the control apparatus 25 judges if the power supply to the target controlled apparatus having the got storage location machine name is in the on state or off state by using a prescribed method (S63).

If the result of the judgement in step S63 is on-state (YES in step S63), the control apparatus 25 gets prescribed contents information (for example, contents name, attribute and storage location directory name) corresponding to the contents name specified in step S61 from the contents table having the storage location contents table name got in step S62, and transmits to the target controlled apparatus a command to transfer the content having the prescribed contents information (S65).

If the result in step S63 is off state (NO in step S63), the control apparatus 25 transmits the magic packet 33 to the target controlled apparatus to turn on the power supply to that apparatus (S64), and then executes the above-mentioned process in step S65.

Thus, the control apparatus 25 gets the content by using the index table 75 in the above process flow. The control apparatus 25 is able to update the index table 75, and other various tables (for example, contents tables 71-1~71-n and contents management table 63) by the following process flow.

Figure 15:
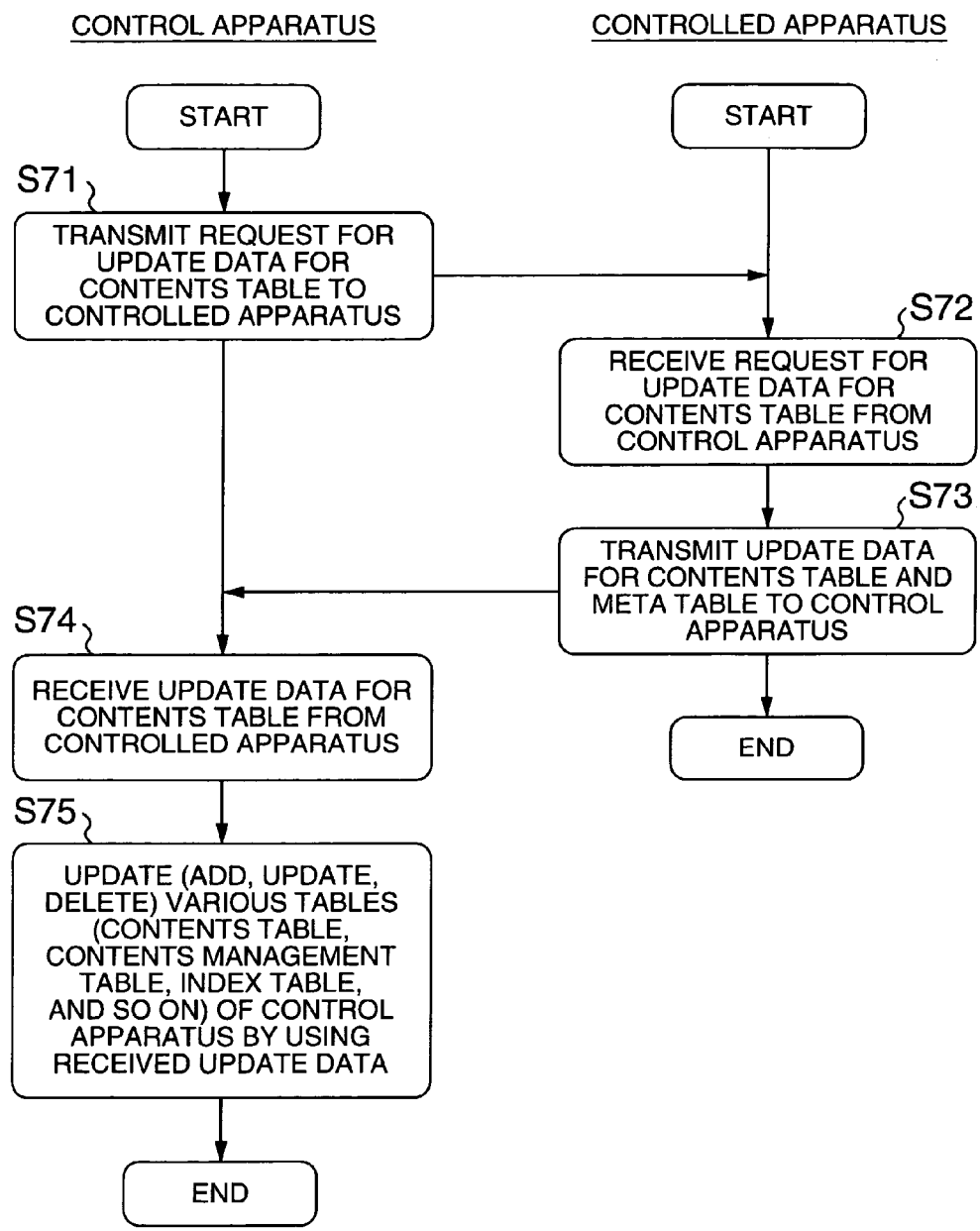
FIG. 15 is a flowchart of processes in which the index table 75 and other various tables of control apparatus 25 are updated.

FIG. 15 is a flowchart of an example of the process flow for updating the index table 75 of control apparatus 25 and other various tables.

The control apparatus 25 transmits in prescribed timing (for example, at regular intervals) a request for update data to update the contents tables 71-1~71-n to a plurality of controlled apparatus 17-1~17-n (S71).

When each of the controlled apparatus 17-1~17-n receives the request (S72), it transmits update data for its own contents table and contents meta table to the control apparatus 25 that has transmitted the request (S73). Here, the "update data" is, for example, the data (for example, additional data, deleted data, data before overwrite and data after overwrite) containing at least one of pieces of data before and after updating the contents table and contents meta table.

The control apparatus 25 receives the update data from the controlled apparatus 17-1~17-n (S74), and uses the update data to update (adds, changes or deletes) data on at least one table of the contents tables 71-1~71-n, contents management table 63, index table 75 and controlled-apparatus management table 61 (S75).

We have described the fourth embodiment as above. In the fourth embodiment, the examination of if the power supply to the target controlled apparatus is in the on state or off state may be made by, for example, sending an inquiry about the power supply status from the control apparatus 25 to the target controlled apparatus, receiving the power supply status (for example, data indicating if the power supply is in the on state or off state) from the network control IC of the target controlled apparatus in response to the inquiry, and interpreting the power supply status. Alternatively, the multiple controlled apparatus 17-1~17-n, in given timing (for example, at regular intervals), may voluntarily notify the control apparatus 25 of the power supply status or respond to the inquiry from the control apparatus 25 to notify the control apparatus 25 of the power supply status, and the control apparatus 25 may interpret the power supply status and manage the status of if the power supply to each of the multiple controlled apparatus 17-1~17-n is in the on state or off sate by using a table and storing it in the cache memory 22. In addition, the control apparatus 25 may respond to a request from the user to display a list of power supply status of each of the multiple controlled apparatus 17-1~17-n. Moreover, the control apparatus 25, when displaying a list of contents on the basis of the index table 75, may display the storage location controlled apparatus of each of contents and its power supply status together with the list. Also, the controlled apparatus 17-1~17-n may voluntarily (for example, each time the contents table 71 and contents meta table 65 are updated) transmit the update data to the control apparatus 25 without the presence or absence of the inquiry from the control apparatus 25.

Thus, according to the fourth embodiment, only by sending from the control apparatus 25 a request to get the contents desired by the user, it is possible that, when the power supply to the controlled apparatus 17 that holds those contents is in the off state, the control apparatus 25 turns on that power supply and gets the contents. Therefore, the user can obtain desired contents without being aware of if the power supply to the controlled apparatus that holds the desired contents is in the on state or off state.

Fifth Embodiment

The fifth embodiment will be described below. The fifth embodiment is a modification of at least one of the first to fourth embodiments, and is the case in which the multiple control apparatus 25 use the same controlled apparatus 17.

For example, it is less possibility that the multiple control apparatus 25 start to use and end to use the same controlled apparatus 17 at the same time. If the possibility is the same for each control apparatus, the controlled apparatus responds faster to the magic packet 33 arrived even a little faster than another by a prescribed method such as exclusive controlling. This is true for the turning-off control of power supply. The following two examples based on this assumption will be described.

(1) The controlled apparatus 17, when receiving the magic packet 33 from the first control apparatus 25 so that its power supply is turned on and then receiving the magic packet 33 from the second control apparatus 25, may generate the power-on completion notice and transmit it to the second control apparatus 25 (or may generate an error notice indicating that the power supply is already in the on state).

(2) The controlled apparatus 17, when receiving the power-off command 34 from the first control apparatus 25 while the controlled apparatus is operating for a prescribed purpose (for example, playing a moving picture file) on the basis of a command from the second control apparatus 25, may decide that the power supply cannot be turned off, and keep this operation without responding to the power-off command 34 (it may notify the first control apparatus of its being operating for a certain purpose).

In this fifth embodiment, for example, the power supply to the controlled apparatus 17 may be preferentially manually turned on, and preferentially remotely turned off.

Specifically, for example, the controlled apparatus, when receiving the manually power-on command under the off-state power supply condition (for example, when the power switch is ordered to manually turn on), may turn on the power supply so that the operating man's "will to turn on the power supply" can take priority.

On the other hand, the controlled apparatus, when receiving the manually power-off command under the on-state power supply condition (for example, when the power switch is ordered to manually turn off), may keep the power supply in the on state ignoring the power-off command which is accepted.

Moreover, in this fifth embodiment, the controlled apparatus 17 may receive the contents play command from a plurality of control apparatus 25 substantially at a time and respond to the contents play command substantially at the same time to produce multiple contents. Specifically, for example, when the controlled apparatus 17 has a play ability of 100 Mbps and when the band necessary for the specified content to be played is 10 Mbps for each of the multiple control apparatus 25, this content can be supplied to the multiple control apparatus 25 substantially at the same time (for example, for two streams, 10 Mbps×2=20 Mbps<100 Mbps).

Sixth Embodiment

The sixth embodiment of the invention will be described below. The sixth embodiment is a modification of the fourth embodiment, and is the case in which a certain control apparatus 25 makes unified management for the contents information (for example, contents table or index table) owned by the plurality of control apparatus 25. In the following description, the control apparatus for the unified management is called "master control apparatus 25M", and the control apparatus that supply the contents information to the master control apparatus 25M is called "slave control apparatus 25S". Therefore, in this sixth embodiment, the master control apparatus 25M is only one apparatus, and the slave control apparatus 25S are one or more apparatus.

The master control apparatus 25M, for example, receives record information of contents meta table 65 from a plurality of controlled apparatus 17-1~17-n and/or record information of contents management table 63 from one or more slave control apparatus 25S, so that the contents meta data (for example, contents names, storage location machine names, storage location directories, attributes such as file type, and playing time length) about all contents that exist on the home LAN 1 can be registered in a table (hereinafter, called "contents centralization management table") constructed in a prescribed storage medium (for example, cache memory 22 or hard disks).

The slave control apparatus 25S have information (for example, MAC address) about the master control apparatus 25M stored in a prescribed storage medium, and thus can obtain contents meta data of desired contents from the master control apparatus 25M in the following process flow.

Figure 16:
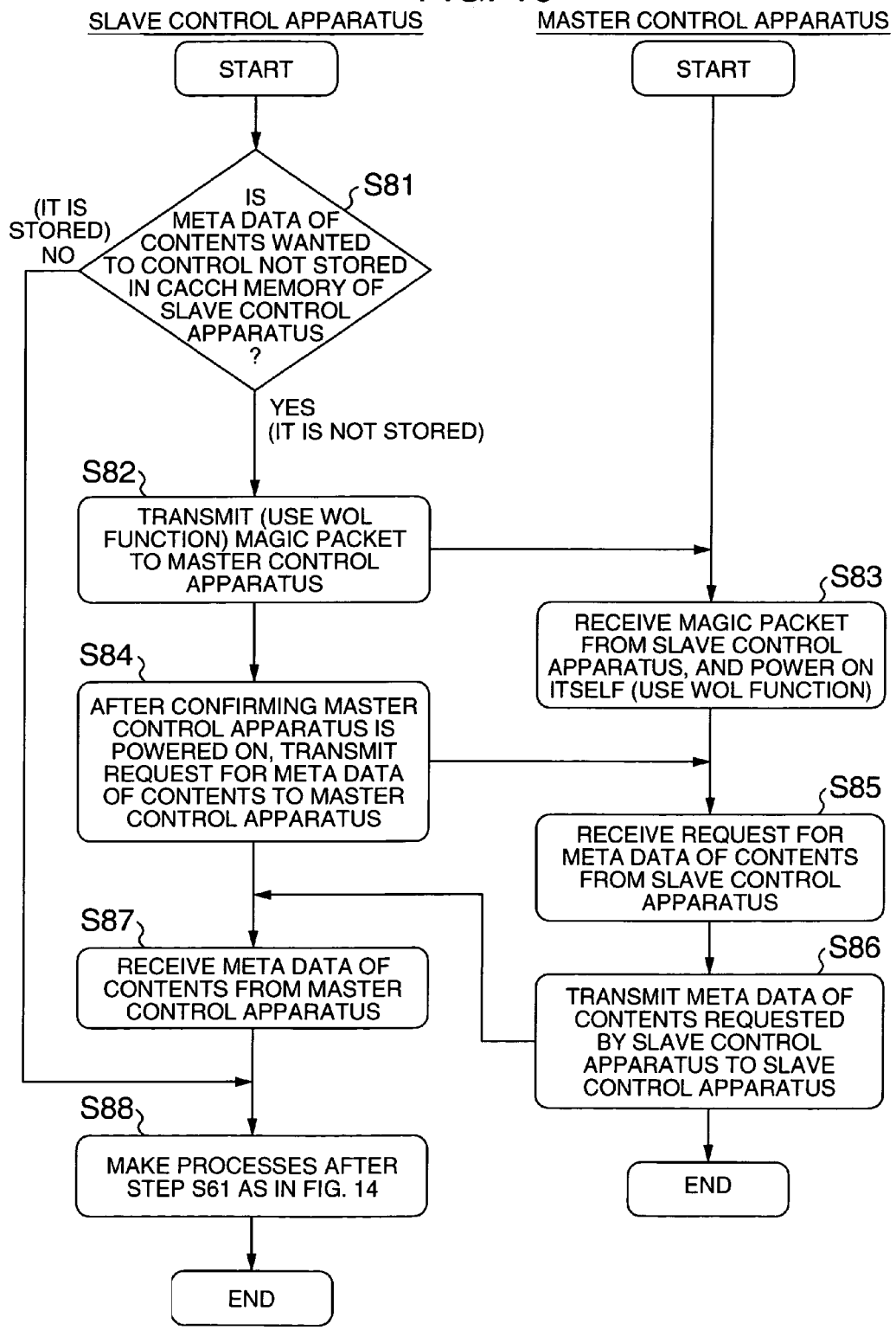
FIG. 16 is a flowchart of processes in which the slave control apparatus 25S gets contents meta data from the master control apparatus 25M in the sixth embodiment of the invention.

FIG. 16 is a flowchart of an example of the process flow for the slave control apparatus 25S to get the contents meta data from the master control apparatus 25M.

The slave control apparatus 25S displays a list of contents meta data (for example, information registered in the index table 75) registered in their own cache memory 22, and a key information input field for key information (for example, contents name) for acquiring the meta data if meta data of desired contents is not recorded on the list. If the above list does not contain the meta data of contents that the user wants to control (for example, play), the user enters desired key information into the key information input field.

The slave control apparatus 25S, if the key information is entered (YES in step S81), examines if the power supply to the master control apparatus 25M is in the on state or off state by using given means. If it is in the off state, the slave control apparatus 25S reads out the MAC address of master control apparatus 25M from the above prescribed storage medium, generates the magic packet 33, and transmits it to the master control apparatus 25M (S82) (if the power supply is in the on state, the slave control apparatus 25S executes the operation of step S84 which will be described later).

When the network control IC (not shown) on the LAN card mounted on the master control apparatus 25M receives the magic packet 33 from the slave control apparatus, it examines if the MAC address contained in the magic packet 33 coincides with the MAC address stored in the given storage medium (for example, ROM on the LAN card) of the master control apparatus 25M. If they coincide with each other, the network control IC turns off the power supply to the main body (S83). Then, the network control IC generates the power-on completion notice and transmits it to the slave control apparatus 25S.

The slave control apparatus 25S receives the power-on completion notice from the master control apparatus 25M to recognize that the power supply to the control apparatus 25M has become in the on state, and then sends a request for contents meta data having the above inputted key information (hereinafter, abbreviated "meta request") to the master control apparatus 25M (S84).

When the master control apparatus 25M receives the meta request (S85), it searches the contents centralization management table for one or a plurality pieces of contents meta data having the key information that is contained in the request, and transmits the found one or a plurality of pieces of contents meta data to the slave control apparatus 25S that has sent the meta request.

When the slave control apparatus 25S receives one or a plurality of pieces of contents meta data from the master control apparatus 25M (S87), it displays on its display screen a list of one or a plurality of pieces of contents meta data. Then, the slave control apparatus 25S executes the processes after the step S61 as shown in FIG. 14 (S88).

We have described one example of the process flow for the slave control apparatus 25S to get the contents meta data from the master control apparatus 25M. A modification of this process flow can be considered as follows.

For example, the slave control apparatus 25S, after the step S87, displays the list of one or a plurality of pieces of contents meta data on its own display screen, and the user designates desired contents meta data from the list. In this case, the slave control apparatus 25S specifies the desired content from the designated contents meta data (for example, contents name and storage location machine name), generates a read command (for example, command containing transmission-source MAC address, contents name of content desired by the user and the storage location machine name) by which the control apparatus can read out from the controlled apparatus that holds the content desired by the user, and transmits it to the master control apparatus 25M.

The master control apparatus 25M interprets the read command from the slave control apparatus 25S to specify the contents desired by the user and the controlled apparatus that holds the desired content (for example, specify the contents name contained in the read command and the MAC address corresponding to the machine name contained in the command). The master control apparatus 25M then examines if the power supply to the specified controlled apparatus is in the on state or off state. If the power supply is in the off state, the master control apparatus 25M generates the magic packet 33 containing the MAC address of the controlled apparatus, and transmits it to the controlled apparatus, thus turning on the power supply of the controlled apparatus. Thereafter, the master control apparatus 25M generates a transfer command (for example, command containing the contents name and the transmission source MAC address contained in the read command) by which the desired content can be transferred to the slave control apparatus 25S that has transmitted the read command, and transmits it to the specified controlled apparatus. The controlled apparatus receives and interprets the transfer command, gets the desired content from the prescribed storage medium, and transfers the desired content to the slave control apparatus 25S that has sent the read command.

Thus, since the master control apparatus 25M controls the power supply of the controlled apparatus to be turned on and off, the controlled apparatus does not necessarily decide if the power supply should be turned on or off.

Seventh Embodiment

The seventh embodiment will be described below. The seventh embodiment is a specific example of the structure and function of the personal computer (hereinafter, abbreviated "PC") 3 in at least one of the first to sixth embodiments.

Figure 17:
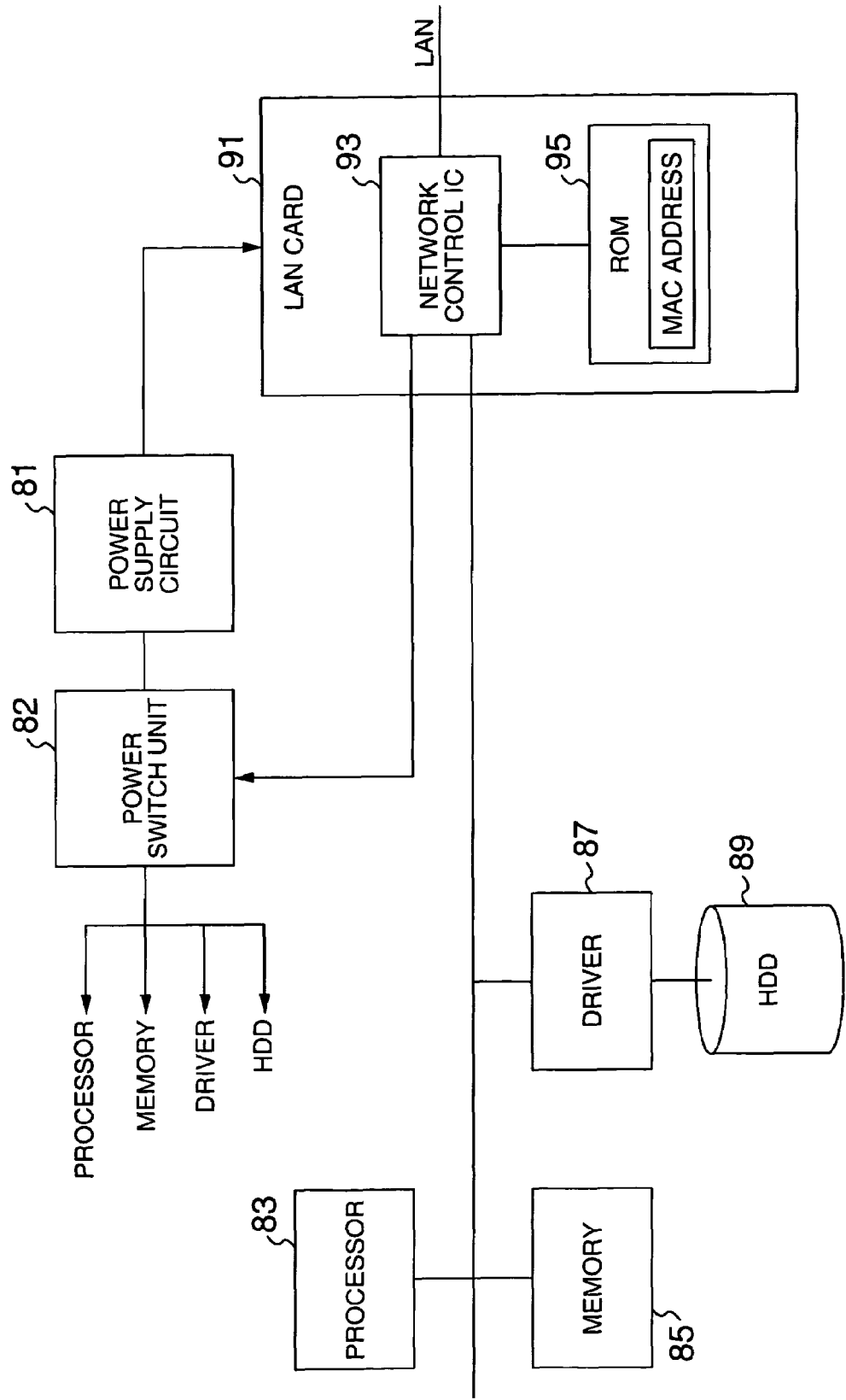
FIG. 17 is a block diagram of the hardware structure of PC 3 in the seventh embodiment of the invention.

FIG. 17 is a block diagram of an example of the hardware structure of PC 3 according to the seventh embodiment.

The PC 3 includes a display screen not shown, a main body (for example, a processor (for example, CPU) 83, a nonvolatile memory (or volatile memory) 85, hard disks (HDD) 89 and a hard disk driver 87), a power supply circuit 81, a power switch unit 82, and a LAN card 91.

The nonvolatile memory 85 is kept a region as a cache memory (hereinafter, called the cache region). The cache region has composed therein, for example, the controlled-apparatus management table 61 (see FIG. 5), the contents management table 63 (see FIG. 7), and the index table 75 (see FIG. 13).

The power supply circuit 81 supplies electric power to the processor 83, memory 85, HDD 89, hard disk driver 87 and LAN card 91 from a prescribed power supply (for example, a charging battery or commercial power supply).

The power switch unit 82 is connected between the power supply circuit 81 and each of the processor 83, the memory 85, the HDD 89 and the hard disk driver 87 to control the power to the processor 83, memory 85, HDD 89 and hard disk driver 87 to turn on and off. The structure of this power switch unit 82 is the same as the power switch unit 40 mentioned in the section of first embodiment.

The LAN card 91 has mounted thereon a network-control IC 93 and a ROM 95 in which the MAC address (and machine name) of this PC 3 are recorded.

The network control IC 93, when this PC 3 functions as control apparatus, gets the MAC address of the controlled apparatus to be controlled in its power from the controlled-apparatus management table 61 stored in the cache region of the nonvolatile memory 85, generates the magic packet 33 containing the got MAC address, and/or power-off command, and transmits it to the controlled apparatus. When this PC 3 functions as controlled apparatus, the network control IC 93 executes the same process as the network control IC 35 (see FIG. 2).

FIG. 18 shows an example of various different GUI pictures displayed on the display screen of the PC 3.

The processor 83 generates the illustrated GUI pictures 101, 103, 105 and 107 on the basis of the information stored in the cache region, and makes them be displayed.

The GUI picture 101 is a list of meta information about the contents (for example, contents names, hereinafter, called "contents meta information") existing on the home LAN 1, and it is an initial picture (for example, the picture displayed, on the basis of the index table 75 that exists in the cache region, immediately after the power supply to the main body is turned on). The user can operate an input device (for example, keyboard or mouse) not shown of the PC 3 to designate desired contents through this GUI picture (hereinafter, called "initial contents list GUI picture) 101.

The GUI picture 103 is a list of contents meta information of contents existing on the home LAN 1, and it is displayed on the basis of the index table 75 (and/or other tables such as contents management table 63) after update. The user can operate the PC 3 to designate desired contents through this GUI picture (hereinafter, called "post-update contents list GUI picture") 103.

The GUI picture 105 is a list of information (for example, machine name) about the controlled apparatus connected to the home LAN 1, and it is displayed on the basis of the controlled-apparatus management table 61. The user can operate the PC 3 to designate a desired controlled apparatus through this GUI picture (hereinafter, called "controlled-apparatus list GUI picture") 105.

The GUI picture 107 is a list of power status information about the power supply status (hereinafter, called "power status management GUI picture") of the controlled apparatus connected to the home LAN 1. The power supply status information includes, for example, "apparatus status" and "power control". The "apparatus status" is the information indicating if the power supply to the main body is in the on state or off state. The "power control" is the information indicating what power control is made on the main body. For example, it is "ON executing" meaning that the power-on completion notice is not received yet while the magic packet 33 has been sent or "status maintained" meaning that neither the magic packet 33 nor the power-off command 34 is transmitted after the power-on and -off has been recognized. The user causes the PC 3 to display this power status management GUI picture, making it possible to instantly understand the power status of any controlled apparatus.

The power supply status management GUI picture 107 is, for example, displayed as follows.

A prescribed storage medium (for example, nonvolatile memory 85) has provided therein a power supply management table that has registered therein one or a plurality of pieces of power status information associated with one or a plurality of controlled apparatus (for example, machine names). The PC 3 updates information of the power supply management table on the basis of, for example, to what controlled apparatus the magic packet 33 and power-off command have been sent or from what controlled apparatus the power-on completion notice and power-off completion notice have been received. The controlled apparatus may transmit the power-on completion notice and power-off completion notice to the control apparatus, not only when, for example, the magic packet 33 and power-off command have been received from the control apparatus, but also when, for example, the power supply is manually turned on and off.

The PC 3 can display the power status management GUI picture 107 by using the power supply management table. The user can operate the PC 3 to designate a controlled apparatus that should be powered on or off through the power status management GUI picture 107, and in response to this designation, the PC 3 may generate the magic packet 33 and power-off command 34 and transmit them to the controlled apparatus.

FIG. 19 shows examples of other different GUI pictures displayed on the display screen of PC 3.

The processor 83 generates the GUI pictures 111, 112, 113 and 114 shown and displays them on the basis of the information stored in the cache region.

The GUI pictures 111 and 112 show the pictures (hereinafter, called "control/status pictures") indicating the status of the controlled apparatus specified through the controlled apparatus list GUI picture 105 shown in FIG. 18. For example, the control/status picture 111 is an example of the picture of the projector 15 (see FIG. 1) selected as a controlled apparatus, or it indicates various types of status (for example, status of focus control and power supply) about the projector 15. In addition, for example, the control/status picture 112 is an example of the picture of HDD recorder 7 selected as a control apparatus, and it indicates the name, status (for example, under reproduction) and connected opponent (for example, the machine name of the transfer destination controlled apparatus) of each of the contents stored in the recorder 7. The PC 3 manages, for example, a prescribed storage medium (for example, nonvolatile memory 85) to show the control/status information of any controlled apparatus placed under various types of status and control, and it generates and displays the control/status picture according to this information. The PC 3 stores certain kinds of requests issued from the PC 3 to certain controlled apparatus and certain kinds of status information received from certain controlled apparatus, thus properly updating the control/status information.

The GUI picture 113 is a picture (hereinafter, called "contents browsing picture") of the contents (for example, a moving picture file) that are read out by PC 3 from a certain controlled apparatus (for example, HDD recorder 7) and are being played. The user can control the played status of contents by operating the menu picture displayed as the picture 113.

The GUI picture 114 is a picture (hereinafter, called "power-off completion notice picture") displayed when the control apparatus 25 transmits the power-off command 34 to HDD recorder 7 and receives the power-off completion notice in response to the command. The PC 3 also displays the same picture when the PC 3 transmits the power-off command 34 to another controlled apparatus 17 and receives the power-off completion notice in response to the command. In addition, when the PC 3 transmits the magic packet 33 and receives the power-on completion notice in response to the packet, the PC 3 may display the picture indicating that the corresponding apparatus has been completely powered on.

FIG. 20 is a flowchart of one example of the process flow by the PC 3.

For example, after the power is turned on, the PC 3 displays the initial contents list GUI picture 101 (S91).

Then, the PC 3 updates the index table 75 in the process flow shown in FIG. 15, and displays the post-contents list GUI picture 103 on the basis of the updated index table 75 (S92). The PC 3 accepts the designation of a desired moving picture file through the post-contents list GUI picture 103 by the user.

Then, the PC 3 accepts the designation of input and output units for the specified moving picture file through the controlled-apparatus list GUI picture 105 (S93). If the input unit is the apparatus in which the specified moving picture file is stored, any input unit is not specified. If the output unit is a PC, it is designated. It is now assumed that the HDD recorder 7 in which the designated moving picture file is stored is specified as the input unit, and that the projector 15 is specified as the output unit.

If the power supplies to the specified HDD recorder 7 (input unit) and projector 15 (output unit) are in the off state, the PC 3 generates the magic packet 33 and transmits it to those apparatus.

The PC 3 displays the power status management GUI picture 107 on its own display screen (S94). Then, the PC 3, when receiving the power-on completion notice from the HDD recorder 7 and projector 15 that responds to the packet 33, updates the contents of the displayed power status management GUI picture 107, and displays the control/status picture associated with the HDD recorder 7 and projector 15 (S95).

The moving picture file that is being played by the HDD recorder 7 is projected on a given screen through the projector 15 (S96). A prescribed trick play (rewinding, pause, etc.) is also executed as the PC 3 makes certain operations. After the moving picture file reproduction has been completed (YES in step S97 and step S98), the PC 3 receives the reproduction completion report from at least one of the HDD recorder 7 and projector 15, and responds to this report to display the control/status picture associated with the HDD recorder 7 and projector 15 (if it is already being displayed, the contents of the displayed picture are updated) (S99).

The PC 3 transmits the power-off command 34 to the HDD recorder 7 and projector 15 (S100). The HDD recorder 7 and projector 15 send the power-off completion notice in response to this command. The PC 3, when receiving the power-off completion notice from those apparatus, displays the power-off completion notice picture 114 on its own display screen. This picture shows that the power supplies to the HDD recorder and projector 15 have been turned off.

FIG. 21 is a flowchart of an example of the process flow that the PC 3 makes when serving as a slave control apparatus.

The PC 3 gets contents meta data by the process flow from S81 to S87 shown in FIG. 16, and displays the contents list GUI picture that has the same contents as the post-contents list GUI picture 103 on the basis of the meta data (S112).

Then, the PC 3 executes the same processes as steps S93~S100 shown in FIG. 18 (S113 through S120).

The PC 3 generates the power-off command 34 and transmits it to the master control apparatus (S121). When receiving the power-off completion notice from the controlled apparatus (the input and output units designated in step 113) and the master control apparatus, the PC 3 displays the power-off completion notice picture 114 that describes those notices (S122).

The PC 3 operates in the following process flow when it serves as the master control apparatus.

The PC 3, in the process flow shown in FIG. 15, collects update data from the controlled apparatus through the home LAN 1, and updates the index table 75. Then, the PC 3 displays the contents list GUI picture on the basis of the updated index table 75, and thereafter executes the step 93 and the following shown in FIG. 20.

Eighth Embodiment

The eighth embodiment will be described below. The eighth embodiment is a specific example of the structure and function of the television set (hereinafter, abbreviated "TV apparatus") 5 in at least one of the first to sixth embodiments.

Figure 23:
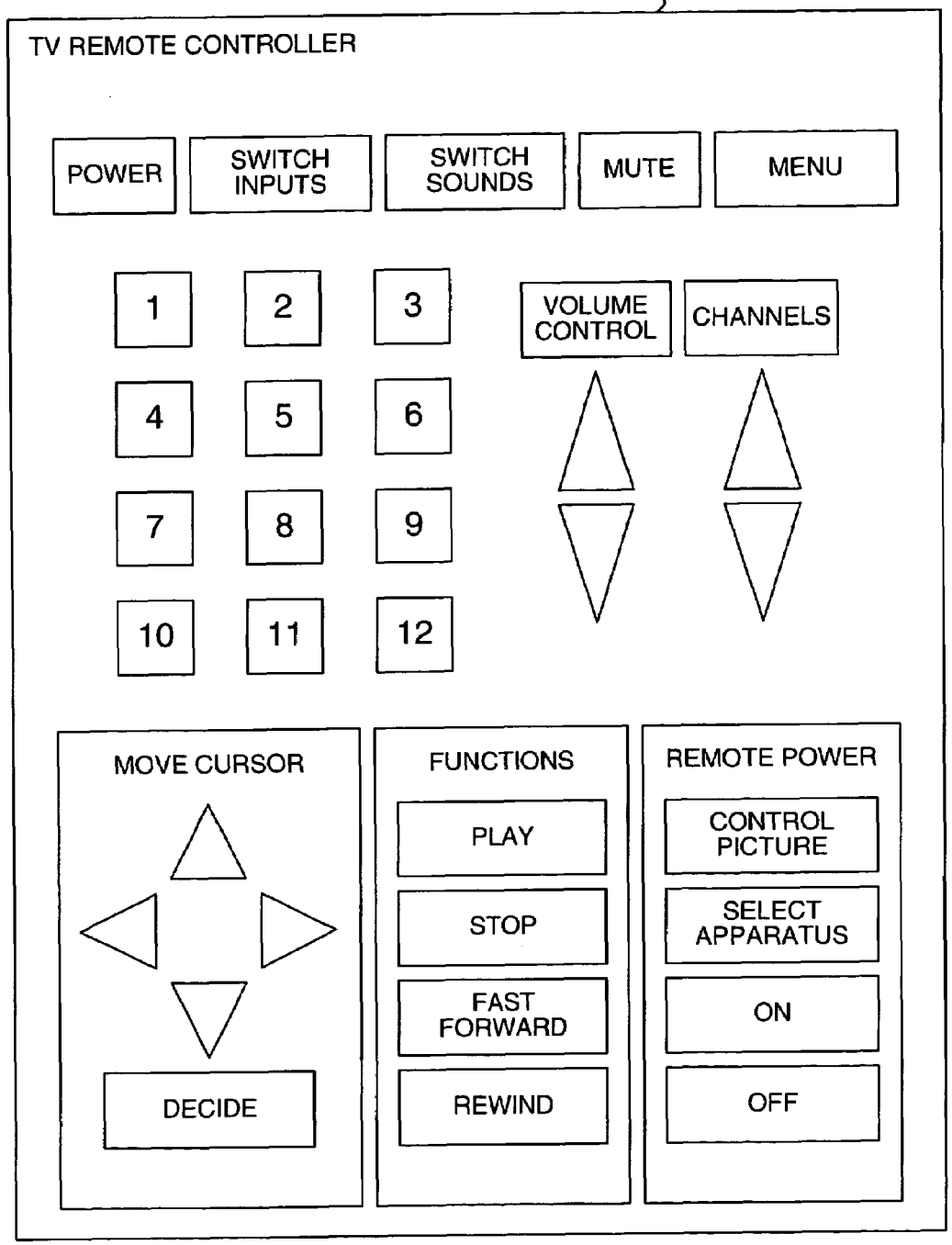
FIG. 23 shows a remote controller of the TV set 5 in the eighth embodiment of the invention.

FIG. 22 is a block diagram of an example of the hardware structure of the TV apparatus 5 according to the eighth embodiment. FIG. 23 shows a remote controller (hereinafter, abbreviated "TV controller") of the TV apparatus 5.

The TV apparatus 5 has a main body (for example, a video circuit 153, a display 155, an audio circuit 154, a loud speaker 156, a remote controller receiving circuit 158, a control circuit 157 and a memory 159) and a LAN card 160.

A TV signal inputted from a receiving antenna 151 into a tuner 152 is separated into a video signal and an audio signal. The video signal is supplied to the video circuit 153, and the audio signal to the audio circuit 154. The video picture based on the video signal provided to the video circuit 153 is displayed on the display 155. The sound based on the audio signal provided to the audio circuit 154 is produced from the loud speaker 156.

The LAN card 160 receives various pieces of information from an external apparatus (for example, control apparatus or controlled apparatus) 161, and executes a prescribed process according to the type of the information. Specifically, it is the same as the LAN card 31 (see FIG. 2) mentioned in the section of first embodiment.

A TV control signal generated from the TV controller 162 shown in FIG. 23 is supplied via the remote controller receiving circuit 158 to the control circuit 157. The control circuit 157 uses the information written in the memory 159 to control the video circuit 153 and audio circuit 154. For example, the control circuit 157, when receiving the signal from the TV controller 162 as a result of pushing "control picture" button, generates and displays the control/status picture on the basis of the information written in the memory 159. When receiving a signal from the TV controller 162 as a result of pushing "select apparatus" button, the control circuit controls the controlled-apparatus list GUI picture 105 to be displayed. In addition, when receiving a signal from the TV controller 162 as a result of pushing "ON" button, the control circuit 157 gets the MAC address of a preselected apparatus, generates the magic packet 33 on the basis of the address, and transmits it to the selected apparatus. Moreover, for example, when receiving a signal from the TV controller 162 as a result of pushing "OFF" button, the control circuit 157 generates the power-off command 33 and transmits it to the selected apparatus.

Ninth Embodiment

The ninth embodiment will be described below. The ninth embodiment is a specific example of the HDD recorder 7 in at least one of the first to sixth embodiments.

FIG. 24 is a flowchart of an example of the process flow the HDD recorder 7 makes according to the ninth embodiment.

The HDD recorder 7 is powered on by the process flow mentioned with reference to FIG. 8, and transmits the power-on completion notice to the control apparatus 25 (S123).

Then, the HDD recorder 7 transmits update data to the contents meta table (the update data may be the updated contents meta data itself) to the control apparatus 25 by the process flow mentioned with reference to FIG. 15 (S124).

The HDD recorder 7 receives from the control apparatus a command to operate as desired by the user (for example, play or fast forward) to the contents specified by the control apparatus (S125), and executes the process based on the operate command to the contents (S126).

The HDD recorder 7, when completing the reproduction of the specified contents (YES in step 127 and S128), reports the completion of the reproduction to the control apparatus 25 (S129), and then receives the power-off command 34 sent from the control apparatus that responds to the report. At this time, the HDD recorder 7 turns off its power supply, and transmits the power-off completion notice to the control apparatus 25 (S130).

Tenth Embodiment

The tenth embodiment will be described below. The tenth embodiment is a specific example of the printer 13 in at least one of the first to sixth embodiments.

FIG. 25 is a flowchart of one example of the process flow that the printer 13 makes according to the tenth embodiment.

The printer 13 is powered on by the process flow mentioned with reference to FIG. 8, and transmits the power-on completion notice to the control apparatus 25 (S131).

Then, the printer 13 receives a printing job (data containing a print command and data to be printed) for the contents designated by the control apparatus 25 (S132), and executes the printing process according to the specified operate command (for example, printing conditions) in response to the job (S133).

The printer 13, when completing the printing process (YES in step S134 and S135), reports the end of the printing to the control apparatus 25 (S136). Then, after receiving the power-off command 34 sent as a result of the response to this report, the printer 13 turns off its power supply, and transmits the power-off completion notice to the control apparatus 25 (S137).

Eleventh Embodiment

The eleventh embodiment will be described below. The eleventh embodiment is a specific example of the video camera in at least one of the first to sixth embodiments.

FIG. 26 is a flowchart of an example of the process flow that the video camera 11 makes according to the eleventh embodiment.

The video camera 11 is powered on by the process flow mentioned with reference to FIG. 8, and transmits the power-on completion notice to the control apparatus 25 (S141).

Then, the video camera 11 receives a camera control command (for example, to start shooting, to end shooting or to make focus control) from the control apparatus 25 (S142). The video camera 11 responds to the command to execute the process according to the command (S143).

The video camera 11, when completing the shooting process (YES in step S144 and S145), reports the end of shooting to the control apparatus 25 (S146). Then, when receiving the power-off command 34 that the control apparatus 25 sends in response to the report, the video camera turns off its power supply and transmits the power-off completion notice to the control apparatus 25 (S147).

We have described the eleven preferred embodiments of the invention. However, these embodiments are examples for explaining the invention, and the scope of the invention is not limited to these embodiments. This invention can take other various different modes without departing from the scope of the invention.

For example, in the first mode of the system according to the invention, the controlled apparatus and the control apparatus, when they are connected to the communications network, may receive the IP addresses assigned. Each of one or a plurality of controlled apparatus may further have IP address sending means for sending the allotted IP address to the communications network. The fixed identification information transmitting means may receive an inquiry for fixed identification information transmitted back from the control apparatus that has received the sent IP address, and respond to this inquiry to read out the fixed identification information from the storage means and to transmit it to the control apparatus. The control apparatus further may have inquiry means that receives one or a plurality of IP addresses from the one or plurality controlled apparatus and sends an inquiry about the fixed identification information to the one and plurality of controlled apparatus identified by the one or plurality of IP addresses. The control storage means may be a cache memory. The fixed identification information receiving means may respond to the inquiry sent from the inquiry means to receive the one or plurality of pieces of fixed identification information. The control means may generate a power control command containing fixed identification information selected from the one or plurality of pieces of fixed identification information stored in the cache memory, and transmit the generated power control command to the controlled apparatus having the selected fixed identification information.

For example, in the first mode of the control apparatus according to the invention, the control apparatus further may have inquiry means that receives one or a plurality of IP addresses from the one or plurality of controlled apparatus to which the one or plurality of IP addresses are allocated by connecting those controlled apparatus to the communications network, and send an inquiry about fixed identification information to the one or plurality of controlled apparatus identified by the one or plurality of IP addresses. The fixed identification information storage means may be a cache memory. The fixed identification information receiving means may respond to the inquiry sent from the inquiry means to receive the one or plurality of pieces of fixed identification information. The control means may generate a power control command (for example, magic packet) containing fixed identification information selected from the one or plurality of pieces of fixed identification information stored in the cache memory, and transmit the generated power control command to the controlled apparatus having the selected fixed identification information.

For example, in the second mode of the control apparatus according to the invention, the control apparatus further may have connected-relation storage means that stores connected-relation information indicating the relation with which the first controlled apparatus and the second controlled apparatus are connected. In this case, if the control means transmits to the first controlled apparatus the power-on command or the power-off command on the basis of the connected-relation information, the same power control command as the above power control command may be transmitted to the one or plurality of second controlled apparatus connected to the first controlled apparatus.

For example, in the third mode of the control apparatus according to the invention, the control apparatus further may have power status storage means for storing user-purpose controlled apparatus identification information by which the user identifies each of the one or plurality of controlled apparatus and power status of each of the one or plurality of controlled apparatus, and power status display means that reads out the user-purpose controlled apparatus identification information and power status associated with each of the one or plurality of controlled apparatus from the power status storage means, and displays on a prescribed display screen a power status list of the one or plurality of pieces of user-purpose controlled apparatus identification information and power status associated with the one or plurality of controlled apparatus. In this case, the fixed identification information storage means may store the one or plurality of pieces of fixed identification information in association with the one or plurality of pieces of user-purpose controlled apparatus identification information. If a controlled apparatus desired by the user is selected from the power status list, the control means may get the fixed identification information associated with the user-purpose controlled apparatus identification information of the selected controlled apparatus from the fixed identification information storage means, generate a power control command containing the got fixed identification information, and transmit the power control command to the controlled apparatus having the got fixed identification information.

For example, in the fourth mode of the control apparatus according to the invention, when the control means intends to request the target controlled apparatus having stored therein user's desired contents to send the contents desired by the user, in which case the power supply to the target controlled apparatus is in the off state, then the control means first may read out the fixed identification information associated with the target controlled apparatus from the fixed identification information storage means, generate a power-on command containing the fixed identification information, and transmit it to the target controlled apparatus before it requests the target controlled apparatus to send the contents desired by the user.

For example, in the fifth mode of the control apparatus according to the invention, the control apparatus further may have completion notice receiving means for receiving from the controlled apparatus the prescribed process completion notice indicating that the prescribed process on contents has been completed. In this case, the control means may turn off the power supply to the controlled apparatus that has sent the prescribed process completion notice when it receives the prescribed process completion notice.

For example, in the sixth mode of the control apparatus according to the invention, if the power supply to the control apparatus is in the off state when the control apparatus receives the prescribed process completion notice in the fifth mode, the control means may receive the power-on command from the controlled apparatus that has sent and turn on the power supply to the control apparatus, and then respond to the prescribed process completion notice to turn off the power supply to the controlled apparatus that has sent.

For example, in the seventh mode of the control apparatus according to the invention, the control means in the fifth mode may transmit a contents control command to do so that a second controlled apparatus can properly process the contents stored in a first controlled apparatus to at least one of the first and second controlled apparatus, and when the prescribed process completion notice is received from at least one of the first and second controlled apparatus, the control means may turn off the power supplies to both first and second controlled apparatus.

For example, in the eighth mode of the control apparatus according to the invention, one of the control apparatus and another one thereof may serve as a slave or master to each other. One of the control apparatus, when serving as the slave, may have master information storage means for storing fixed identification information of a master control apparatus that serves as the master, and means for accepting a request for contents information about contents desired by the user. The control means may respond to the request to read out the fixed identification information of the master control apparatus from the master information storage means, generate a power-on command containing the fixed identification information, transmit the power-on command to the master control apparatus, and then transmit the request for the contents information to the master control apparatus. The control apparatus, when serving as the master, may have contents information storage means for storing one or more pieces of contents information corresponding to one or more contents stored in the one or plurality of controlled apparatus. The control means may receive the power-on command from the slave control apparatus that serves as the slave to turn on the power supply, later accept the request for the contents information, get the requested contents information from the one or more pieces of contents information that the contents information storage means holds, and transmit the got contents information to the slave control apparatus or order the controlled apparatus that holds the contents to transmit the contents identified by the got contents information to the slave control apparatus.

For example, in the first mode of the controlled apparatus according to the invention, the controlled apparatus may have IP address transmission means for sending to the communications network the IP address assigned when connected to the communications network. The fixed identification information transmission means may receive an inquiry about fixed identification information from the control apparatus that has received the transmitted IP address, and respond to the inquiry to read out the fixed identification information from the storage means and transmit it to the control apparatus. The controlled means may receive the power control command from the control apparatus and control the power supply to the controlled apparatus in accordance with the power control command.

For example, in the second mode of the controlled apparatus according to the invention, the controlled means may keep the power supply in the on state without following the power-off command received from the control apparatus if the controlled apparatus is in a prescribed state.

For example, in the third mode of the controlled apparatus according to the invention, when the controlled apparatus is connected to another controlled apparatus, the controlled means, when receiving the power control command, may execute the power control process based on the power control command, and order the other controlled apparatus to make the same power control process.

For example, in the fourth mode of the controlled apparatus according to the invention, the controlled means, when making the process as specified on the contents specified by the control apparatus and finishing it, may automatically turn off the power supply to the controlled apparatus or it may transmit a certain process end notice that means the end of the process to the control apparatus and turn off the power supply to the controlled apparatus on the basis of the power-off command sent in response to this notice and received from the control apparatus.

For example, in the fifth mode of the controlled apparatus according to the invention, the controlled means may transfer the contents specified by the control apparatus to another controlled apparatus specified by the control apparatus, and turn off the power supplies to both controlled apparatus and other controlled apparatus when a prescribed process on the contents has been completed by the other controlled apparatus.

For example, in the sixth mode of the controlled apparatus according to the invention, the controlled means may transfer the contents specified by the control apparatus to another controlled apparatus specified by the control apparatus, transmit to the control apparatus a power-off transmission command that means an order to transmit the power-off command to both controlled apparatus and other controlled apparatus when the other controlled apparatus has completed a prescribed process on the contents, and turn off the power to the controlled apparatus when receiving the power-off command sent in response to the command from the control apparatus.

For example, in the seventh mode of the controlled apparatus according to the invention, the controlled apparatus in the sixth mode may have control apparatus storage means for storing invariable control apparatus fixed identification information for identifying the control apparatus. In this case, if the power supply to the control apparatus is in the off state, the controlled means may read out the control apparatus fixed identification information from the control apparatus storage means, generate the power-on command containing the control apparatus fixed identification information, transmit it to the control apparatus, and subsequently send the power-off transmission command to the control apparatus.

Incidentally, the above-mentioned "power control command" is the power-on command that means a command to turn on the power supply such as the magic packet 33 or the power-off command that means a command to turn off the power supply. The power-off command may include fixed identification information such as MAC address or apparatus identification information (for example, production serial number) or may be a command that can be designated by IP address. In addition, for example, the power-off command may be a command that means to completely turn off the power supply, or a command that means to make the so-called power-saving mode in which the power supply is not completely turned off.

Moreover, for example, the invention can be applied not only to the LAN but also to other communications networks such as Internet. Specifically, in the case when the first apparatus transmits the power-on command to the second apparatus, the power-on command may be constructed so that the portion of MAC address can be recognized as data packet so as not to be rewritten (in other words, the power-on command includes the MAC address of the second apparatus) and it is transmitted to the second apparatus. The second apparatus interprets the power-on command, gets the MAC address of the second apparatus from the power-on command and turns on its own power supply.

In addition, for example, other invariable identification information (for example, machine name, production serial number of the apparatus, or IP address according to IPv6) may be included in the power-on command in place of or in addition to the MAC address.

Also, for example, the connection apparatus (for example, the control apparatus or controlled apparatus) connected to a communications network (for example, LAN 1) may manage the power status of another connection apparatus (for example, the control apparatus or controlled apparatus) connected to the communications network. In this case, the connection apparatus may execute at least one of the following four processes (1)~(4).

Process (1) to recognize the power status of another connection apparatus as the on state or off state when it transmits the power-on command or power-off command to the other connection apparatus.

Process (2) to recognize the power status of another connection apparatus as the on state or off state when it receives a notice of power-on or power-off state from the other connection apparatus that has received the power-on command or power-off command or of which the power switch is turned on or off manually by the user.

Process (3) to recognize the power status of another connection apparatus as the on state or off state when it transmits an inquiry as to power status to the other connection apparatus and receives a reply signal that means power-on state or off-state from the other connection apparatus.

Process (4) to recognize the power status of another connection apparatus as the off state when it does not receive any reply signal a constant time after it transmits an inquiry as to the power status to the other connection apparatus.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A remote control system for remotely controlling an apparatus connected to a communications network, comprising:
   one or a plurality of controlled apparatus; and
   a control apparatus for controlling said controlled apparatus through said communications network,
   wherein, each of said one or plurality of controlled apparatus includes:
      controlled storage means for storing invariable fixed identification information for uniquely identifying said controlled apparatus; and
      fixed identification information transmission means for, when main power of said controlled apparatus is in an ON state, reading out said fixed identification information from said controlled storage means and transmitting said fixed identification information through said communications network to said control apparatus, and
   said control apparatus includes:
      fixed identification information receiving means for, when said main power of said controlled apparatus is in the ON state, receiving one or a plurality of pieces of fixed identification information from said controlled apparatus through said communications network;
      control storage means for storing said received one or plurality of pieces of fixed identification information corresponding to said controlled apparatus; and
      control means for, when said main power of said controlled apparatus is in an OFF state while said control means remains powered, controlling a turning on of said main power of said controlled apparatus through said communications network by using said one or plurality of pieces of fixed identification information corresponding to said controlled apparatus, as stored in said control storage means.

2. A remote control system according to claim 1, wherein
   said controlled apparatus and said control apparatus respectively receive IP addresses allocated when being connected to said communications network,
   each of said one or plurality of controlled apparatus further has an IP address transmission means for transmitting said allocated IP address to said communications network,
   said control apparatus further has inquiry means that receives said allocated IP address from said controlled apparatus via said communications network, and sends an inquiry as to the fixed identification information to said controlled apparatus identified by said allocated IP addresses,
   said fixed identification information transmission means receives the inquiry as to fixed identification information from said control apparatus, and responds to said inquiry to read out said fixed identification information from said storage means and transmit it to said control apparatus,
   said control storage means is a cache memory,
   said fixed identification information receiving means receives said one or plurality of pieces of fixed identification information resultant from said inquiry, and
   said control means generates a power control command containing selected fixed identification information selected from said one or plurality of pieces of fixed identification information stored in said cache memory, and transmits the generated said power control command to said controlled apparatus having said selected fixed identification information.

3. A control apparatus for remotely controlling one or a plurality of controlled apparatus connected to a communications network, said control apparatus comprising:
   when main power of said controlled apparatus is in an ON state;
      fixed identification information receiving means for receiving one or a plurality of pieces of fixed identification information for identifying said one or plurality of controlled apparatus from said one or plurality of controlled apparatus through said communications network;
      fixed identification information storage means for storing said received one or plurality of fixed identification information, corresponding to said one or plurality of controlled apparatus; and
   when said main power of said controlled apparatus is in an OFF state;
      control means for controlling turning on of said main power of said one or plurality of controlled apparatus through said communications network by using said one or plurality of pieces of fixed identification information stored in said fixed identification information storage means, said control means remaining powered while said main power of said controlled apparatus is in the OFF state.

4. A control apparatus according to claim 3, comprising inquiry means for receiving one or a plurality of IP addresses from said one or plurality of controlled apparatus to which said one or plurality of IP addresses are allocated when said one or plurality of controlled apparatus are connected to said communications network, and for sending an inquiry as to fixed identification information to said one or plurality of controlled apparatus identified by said one or plurality of IP addresses, wherein
   said fixed identification information storage means is a cache memory,
   said fixed identification information receiving means receives said one or plurality of pieces of fixed identification information, responsive to said inquiry, and
   said control means generates a power control command containing selected fixed identification information selected from said one or plurality of pieces of fixed identification information stored in said cache memory, and transmits the generated said power control command to said controlled apparatus having said selected fixed identification information.

5. A control apparatus according to claim 3, comprising connection relation storage means for storing connection relation information indicating which second controlled apparatus is connected to which first controlled apparatus, wherein
   responsive to a power-on command or a power-off command transmitted to said first controlled apparatus, said control means transmits a command corresponding to the power-on command or power-off command to said second controlled apparatus connected to said first controlled apparatus, on the basis of said connection relation information.

6. A control apparatus according to claim 3, comprising:
   power status storage means for storing user-purpose controlled apparatus identification information for the user to identify: each of said one or plurality of controlled apparatus and power status of each of said one or plurality of controlled apparatus; and
   power status display means for reading out said user-purpose controlled apparatus identification information corresponding to said one or plurality of controlled apparatus and said power status, from said power status storage means, and for displaying on a certain display screen a power status list of said user-purpose controlled apparatus identification information and power status corresponding to said one or plurality of controlled apparatus, wherein said fixed identification information storage means stores said one or plurality of pieces of fixed identification information in association with a corresponding said user-purpose controlled apparatus identification information, and said control means, when a controlled apparatus desired by the user is selected from said power status list, retrieves fixed identification information corresponding to said user-purpose controlled apparatus identification information of a selected said controlled apparatus from said fixed identification information storage means, generates a power control command containing a retrieved said fixed identification information, and transmits said power control command to said controlled apparatus having the retrieved said fixed identification information.

7. A control apparatus according to claim 3, wherein said control means, when a target controlled apparatus to be requested to send desired contents desired by the user has the main power in the off state, first reads out fixed identification information associated with said target controlled apparatus from said fixed identification information storage means, generates a power-on command containing said fixed identification information, transmits said power-on command to said target controlled apparatus, and subsequently reguests said target controlled apparatus to send said desired contents.

8. A control apparatus according to claim 3, comprising completion notice receiving means for receiving a process completion notice from one of said controlled apparatus to signal completion of a process regarding contents from said one of said controlled apparatus, wherein said control means responds to said process completion notice, so as to turn off the main power to said one of said controlled apparatus that had sent said process completion notice.

9. A control apparatus according to claim 8, wherein if the power supply to said control apparatus is in the off state when said completion notice receiving means is to receive said process completion notice, said control means receives said power-on command from said controlled apparatus, turns on the power supply to said control apparatus responsive to said power-on command, and subsequently responds to said process completion notice so as to turn off the main power to said controlled apparatus.

10. A control apparatus according to claim 8, wherein said control means transmits a contents control command that orders a second controlled apparatus to perform the process on the contents stored in a first controlled apparatus, to at least one of said first and second controlled apparatus, and when receiving said process completion notice from at least one of said first and second controlled apparatus, said control means turns off the main power to both said first and second controlled apparatus.

11. A control apparatus according to claim 3, said control apparatus serving as either a slave or master relative to another control apparatus, in which case:

when said control apparatus serves as said slave to a master control apparatus, said control apparatus comprising:

master information storage means for storing fixed identification information of said master control apparatus: and means for receiving a request for contents information regarding contents desired by a user, wherein said control means responds to said request to read out said fixed identification information of said master control apparatus from said master information storage means, generates a power-on command containing said fixed identification information, transmits said power-on command to said master control apparatus, and subsequently transmits said request for said contents information to said master control apparatus, and when said control apparatus serves as said master to a slave control apparatus, said control apparatus comprising:

contents information storage means for storing one or more pieces of contents information corresponding to one or more contents stored in said one or plurality of controlled apparatus, wherein said control means receives said power-on command from said slave control apparatus, thus turning on the power supply, and subsequently said control means receives a request for said contents information, retrieves the requested said contents information from said one or more pieces of contents information stored in said contents information storage means, and transmits a retrieved said contents information to said slave control apparatus or orders said controlled apparatus that holds said contents to send said contents identified by the retrieved said contents information to said slave control apparatus.

12. A controlled apparatus controlled by a control apparatus through a communications network, comprising:

controlled storage means for storing invariable fixed identification information by which said controlled apparatus can be uniquely identified;

fixed identification information transmission means for, when main power of said controlled apparatus is in an ON state, reading out said fixed identification information from said controlled storage means, and transmitting said fixed identification information through said communications network to said control apparatus; and controlled means for, when the main power of said controlled apparatus is in an OFF state while said controlled means remains powered, being controlled to turn the main power of said controlled apparatus on responsive to a power control command issued by said control apparatus that has received said fixed identification information.

13. A controlled apparatus according to claim 12, comprising IP address transmission means for transmitting to a communications network, an IP address allocated when said apparatus is connected to said communications network, wherein said fixed identification information transmission means receives an inquiry as to said fixed identification information from said control apparatus that has received said sent IP address, and responds to said inquiry to read out said fixed identification information from said storage means and transmit it to said control apparatus, and said controlled means receives the power control command from said control apparatus, and controls the main power to said controlled apparatus in accordance with said power control command.

14. A controlled apparatus according to claim 12, wherein said controlled means, when receiving a power-off control command from said control apparatus, keeps the main power in the on state without following said power-off control command if said controlled apparatus is in a predetermined state.

15. A controlled apparatus according to claim 12, wherein when said controlled apparatus is connected to another controlled apparatus, said controlled means, when receiving said power control command, executes a power control process requested by said power control command, and orders said other controlled apparatus to execute a power control process corresponding to said power control command.

16. A controlled apparatus according to claim 12, wherein said controlled means executes a process which is specified by said control apparatus on contents specified by said control apparatus, and when said process is completed, said controlled means automatically turns off the main power to said controlled apparatus or transmits a process completion notice to said control apparatus signaling completion of said process, and turns off the main power to said controlled apparatus on a basis of a power-off control command that is received from said control apparatus in response to said process completion notice.

17. A controlled apparatus according to claim 12, wherein said controlled means transfers contents specified by said control apparatus to another controlled apparatus specified by said control apparatus, and when said other controlled apparatus completes a prescribed process on said contents, said controlled means turns off the main power to both said controlled apparatus and said other controlled apparatus.

18. A controlled apparatus according to claim 12 wherein said controlled means transfers contents specified by said control apparatus to another controlled apparatus specified by said control apparatus, and when said other controlled apparatus completes a prescribed process on said contents, said controlled means transmits to said control apparatus a power-off transmission command that means to transmit a power-off command to both said controlled apparatus and said other controlled apparatus, thus the main power to said controlled apparatus being turned off when said power-off command is sent and received from said control apparatus in response to said power-off transmission command.

19. A controlled apparatus according to claim 18, comprising:

control apparatus storage means for storing invariable control apparatus fixed identification information for identifying said control apparatus, wherein said controlled means, when the power supply to said control apparatus is in the off state, reads out said control apparatus fixed identification information from said control apparatus storage means, generates a power-on command containing said control apparatus fixed identification information, and transmits said power-on command to said control apparatus, and subsequently said controlled means transmits said power-off transmission command to said control apparatus.

\* \* \* \* \*